US012739859B2

(12) United States Patent
Wang et al.

(10) Patent No.: US 12,739,859 B2
(45) Date of Patent: Sep. 15, 2026

(54) INDICATING NETWORK SUPPORT OF VARIOUS SIDELINK (SL) FUNCTIONALITY

(71) Applicant: Telefonaktiebolaget LM Ericsson (publ), Stockholm (SE)

(72) Inventors: Min Wang, Luleå (SE); Antonino Orsino, Kirkkonummi (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 277 days.

(21) Appl. No.: 18/693,386

(22) PCT Filed: Sep. 5, 2022

(86) PCT No.: PCT/EP2022/074628
§ 371 (c)(1),
(2) Date: Mar. 19, 2024

(87) PCT Pub. No.: WO2023/052049
PCT Pub. Date: Apr. 6, 2023

(65) Prior Publication Data

US 2025/0133576 A1 Apr. 24, 2025

Related U.S. Application Data

(60) Provisional application No. 63/250,833, filed on Sep. 30, 2021.

(51) Int. Cl.
*H04W 72/00* (2023.01)
*H04W 8/00* (2009.01)
*H04W 72/25* (2023.01)

(52) U.S. Cl.
CPC .......... *H04W 72/25* (2023.01); *H04W 8/005* (2013.01)

(58) Field of Classification Search
CPC ..... H04W 48/12; H04W 48/16; H04W 72/25; H04W 8/005; H04W 84/18; H04W 76/19; H04W 4/80
See application file for complete search history.

(56) References Cited

U.S. PATENT DOCUMENTS 12,127,296 B2 * 10/2024 Kang .................... H04W 8/005
2018/0279275 A1 * 9/2018 Chen .................... H04W 72/23
(Continued)

OTHER PUBLICATIONS

"3GPP TR 32.846 V1.1.0", 3rd Generation Partnership Project; Technical Specification Group Services and System Aspects; Charging management; Study on charging aspects of Proximity-based Services (ProSe) in 5GS (Release 17), Aug. 2021, pp. 1-36.
(Continued)

*Primary Examiner* — Khai M Nguyen
(74) *Attorney, Agent, or Firm* — Murphy, Bilak & Homiller, PLLC

(57) ABSTRACT

Embodiments include methods for a first user equipment (UE) configured for sidelink (SL) operation in a cell of a radio access network (RAN). Such methods include receiving, from a RAN node via the cell, one or more messages including a configuration for SL discovery and/or 5 communications. The configuration includes at least one of the following: a first indication of whether the RAN node supports SL relay functionality, a second indication of whether the RAN node supports SL discovery functionality, and one or more SL discovery configurations for UEs. Such methods also include, based on the configuration, selectively initiating a SL discovery procedure to discover at least a second UE that supports SL communications. Other embodiments 0 include complementary methods for a RAN node, as well as UEs and RAN nodes configured to perform such methods.

24 Claims, 15 Drawing Sheets

(56) References Cited

U.S. PATENT DOCUMENTS

| | | | | |
|---|---|---|---|---|
| 2020/0100088 | A1* | 3/2020 | Kim | H04W 48/16 |
| 2021/0160956 | A1 | 5/2021 | Wang et al. | |
| 2022/0312177 | A1* | 9/2022 | Yu | H04W 8/005 |
| 2022/0416881 | A1* | 12/2022 | Paladugu | H04W 48/16 |
| 2023/0217232 | A1* | 7/2023 | Cheng | H04W 8/005 370/328 |
| 2023/0336961 | A1* | 10/2023 | Orsino | H04W 40/026 |
| 2023/0388770 | A1* | 11/2023 | Wang | H04W 76/14 |
| 2024/0080658 | A1* | 3/2024 | Chen | H04W 8/22 |

OTHER PUBLICATIONS

"3GPP TS 23.304 V0.3.0", 3rd Generation Partnership Project; Technical Specification Group Services and System Aspects; Proximity based Services (ProSe) in the 5G System (5GS) (Release 17), May 2021, pp. 1-90.

"3GPP TS 23.304 V17.0.0", 3rd Generation Partnership Project; Technical Specification Group Services and System Aspects; Proximity based Services (ProSe) in the 5G System (5GS) (Release 17), Sep. 2021, pp. 1-99.

"3GPP TS 23.501 V17.2.0", 3rd Generation Partnership Project; Technical Specification Group Services and System Aspects; System architecture for the 5G System (5GS); Stage 2 (Release 17), Sep. 2021, pp. 1-542.

"3GPP TS 24.501 V17.3.0", 3rd Generation Partnership Project; Technical Specification Group Core Network and Terminals; Non-Access-Stratum (NAS) protocol for 5G System (5GS); Stage 3; (Release 17), Jun. 2021, pp. 1-825.

"3GPP TS 32.277 V16.0.0", 3rd Generation Partnership Project; Technical Specification Group Services and System Aspects; Telecommunication management; Charging management; Proximity-based Services (ProSe) charging (Release 16), Jul. 2020, pp. 1-118.

"3GPP TS 33.501 V17.3.0", 3rd Generation Partnership Project; Technical Specification Group Services and System Aspects; Security architecture and procedures for 5G system (Release 17), Sep. 2021, pp. 1-258.

"3GPP TS 36.314 V16.0.0", 3rd Generation Partnership Project; Technical Specification Group Radio Access Network; Evolved Universal Terrestrial Radio Access (E-UTRA); Layer 2—Measurements (Release 16), Jul. 2020, pp. 1-28.

"3GPP TS 36.331 V15.13.0", 3rd Generation Partnership Project; Technical Specification Group Radio Access Network; Evolved Universal Terrestrial Radio Access (E-UTRA); Radio Resource Control (RRC); Protocol specification (Release 15), Mar. 2021, pp. 1-949.

"3GPP TS 38.314 V16.1.0", 3rd Generation Partnership Project; Technical Specification Group Radio Access Network; NR; Layer 2 Measurements; (Release 16), Sep. 2020, pp. 1-18.

"3GPP TS 38.331 V17.5.0", 3rd Generation Partnership Project; Technical Specification Group Radio Access Network; NR; Radio Resource Control (RRC) protocol specification (Release 16), Jun. 2023 pp. 1-1328.

"3GPP TS 38.211 V16.6.0", 3rd Generation Partnership Project; Technical Specification Group Radio Access Network; NR; Physical channels and modulation (Release 16), Jun. 2021, pp. 1-134.

"3GPP TS 22.261 V18.1.1", 3rd Generation Partnership Project; Technical Specification Group Services and System Aspects; Service requirements for the 5G system; Stage 1 (Release 18), Jan. 2021, pp. 1-85.

"3GPP TR 23.752 V17.0.0", 3rd Generation Partnership Project; Technical Specification Group Services and System Aspects; Study on system enhancement for Proximity based Services (ProSe) in the 5G System (5GS) (Release 17), Mar. 2021, pp. 1-183.

"Email discussion summary for [93e-23-SLRelay-WI]", [93e-23-SLRelay-WI]—Version 0.0.4 RAN, 3GPP TSG RAN#93e, RP-212563, Sep. 13-17, 2021, pp. 1-16.

"Further discussion on relay discovery", 3GPP TSG-RAN WG2 Meeting #115 electronic, Online, R2-2108143, Aug. 2021, pp. 1-5.

"Leftover issues for SL discovery", 3GPP TSG-RAN WG2 #115e, Electronic meeting, R2-2107468, Aug. 16-27, 2021, pp. 1-3.

"New WID on NR Sidelink Relay", 3GPP TSG RAN Meeting #92e, RP-211050, Electronic Meeting, was RP-210904, Jun. 14-18, 2021, pp. 1-5.

"New WID on NR Sidelink Relay", 3GPP TSG RAN Meeting #93e, RP-212601, Electronic Meeting, was RP-211050, Sep. 13-17, 2021, pp. 1-5.

"Remaining issues on Relay Discovery Procedure", 3GPP TSG-RAN WG2 Meeting #114 electronic, R2-2104958, E-Meeting, May 19-27, 2021, pp. 1-6.

"3GPP TS 36.300 V16.5.0", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16), Mar. 2021, pp. 1-391.

"3GPP TS 38.300 V16.6.0", 3rd Generation Partnership Project; Technical Specification Group Radio Access Network; NR; NR and NG-RAN Overall Description; Stage 2 (Release 16), Jun. 2021, pp. 1-152.

"3GPP TS 38.214 V15.0.0", 3rd Generation Partnership Project; Technical Specification Group Radio Access Network; NR; Physical layer procedures for data (Release 15), Dec. 2017, pp. 1-71.

"3GPP TS 38.304 V16.4.0", 3rd Generation Partnership Project; Technical Specification Group Radio Access Network; NR; User Equipment (UE) procedures in Idle mode and RRC Inactive state Release 16), Mar. 2021, pp. 1-39.

"3GPP TR 23.752 V2.0.0", 3rd Generation Partnership Project; Technical Specification Group Services and System Aspects; Study on system enhancement for Proximity based Services (ProSe) in the 5G System (5GS) (Release 17), Mar. 2021, pp. 1-183.

P V, Latha, et al., "Device to Device Communication in LTE", www.sasken.com, Jun. 14, 2016, pp. 1-15.

"New WID on NR Sidelink Relay", Ericsson, 3GPP TSG RAN Meeting #91e RP-210893, Electronic Meeting, Mar. 16-26, 2021, pp. 1-5.

* cited by examiner

```
-- TAG-SIB1-START

SIB1 ::=         SEQUENCE {
    cellSelectionInfo          SEQUENCE {
        q-RxLevMin                Q-RxLevMin,
        q-RxLevMinOffset          INTEGER (1..8)         OPTIONAL,   -- Need S
        q-RxLevMinSUL             Q-RxLevMin             OPTIONAL,   -- Need R
        q-QualMin                 Q-QualMin              OPTIONAL,   -- Need S
        q-QualMinOffset           INTEGER (1..8)         OPTIONAL    -- Need S
    }                                                    OPTIONAL,   -- Cond
Standalone
    cellAccessRelatedInfo      CellAccessRelatedInfo,
    connEstFailureControl      ConnEstFailureControl     OPTIONAL,   -- Need R
    si-SchedulingInfo          SI-SchedulingInfo         OPTIONAL,   -- Need R
    servingCellConfigCommon    ServingCellConfigCommonSIB OPTIONAL,  -- Need R
    ims-EmergencySupport       ENUMERATED {true}         OPTIONAL,   -- Need R
    eCallOverIMS-Support       ENUMERATED {true}         OPTIONAL,   -- Need R
    ue-TimersAndConstants      UE-TimersAndConstants     OPTIONAL,   -- Need R
    uac-BarringInfo            SEQUENCE {
        uac-BarringForCommon       UAC-BarringPerCatList   OPTIONAL,   -- Need S
        uac-BarringPerPLMN-List    UAC-BarringPerPLMN-List OPTIONAL,   -- Need S
        uac-BarringInfoSetList     UAC-BarringInfoSetList,
        uac-AccessCategory1-SelectionAssistanceInfo CHOICE {
            plmnCommon                 UAC-AccessCategory1-
SelectionAssistanceInfo,
            individualPLMNList         SEQUENCE (SIZE (2..maxPLMN)) OF
                                       UAC-AccessCategory1-
SelectionAssistanceInfo
        }                                                  OPTIONAL    -- Need S
    }                                                      OPTIONAL,   -- Need R
    useFullResumeID            ENUMERATED {true}           OPTIONAL,   -- Need R
    lateNonCriticalExtension   OCTET STRING                OPTIONAL,
    nonCriticalExtension       SIB1-v1610-IEs              OPTIONAL
}

SIB1-v1610-IEs ::=               SEQUENCE {
    idleModeMeasurementsEUTRA-r16    ENUMERATED{true}        OPTIONAL,  -- Need R
    idleModeMeasurementsNR-r16       ENUMERATED{true}        OPTIONAL,  -- Need R
    posSI-SchedulingInfo-r16         PosSI-SchedulingInfo-r16 OPTIONAL,  -- Need R
    nonCriticalExtension             SIB1-v1630-IEs          OPTIONAL
}

SIB1-v1630-IEs ::=               SEQUENCE {
    uac-BarringInfo-v1630           SEQUENCE {
        uac-AC1-SelectAssistInfo-r16   SEQUENCE (SIZE (2..maxPLMN)) OF
                                       UAC-AC1-SelectAssistInfo-r16
    }                                                       OPTIONAL,  -- Need R
    nonCriticalExtension            SIB1-v17xy-IEs          OPTIONAL
}

SIB1-v17xy-IEs ::=         SEQUENCE {
    sl-RelaySupport          ENUMERATED{L2, L3, both}          OPTIONAL, -- Need R
    sl-DiscoverySupport      ENUMERATED{relay, non-relay, both} OPTIONAL, -- Need R
    nonCriticalExtension     SEQUENCE {}                       OPTIONAL
}

UAC-AccessCategory1-SelectionAssistanceInfo ::=    ENUMERATED {a, b, c}

UAC-AC1-SelectAssistInfo-r16 ::=     ENUMERATED {a, b, c, notConfigured}

-- TAG-SIB1-STOP
-- ASN1STOP
```

FIG. 11

```
-- TAG-SIB1-START

SIB1 ::=        SEQUENCE {
    cellSelectionInfo          SEQUENCE {
        q-RxLevMin                Q-RxLevMin,
        q-RxLevMinOffset          INTEGER (1..8)          OPTIONAL,   -- Need S
        q-RxLevMinSUL             Q-RxLevMin              OPTIONAL,   -- Need R
        q-QualMin                 Q-QualMin               OPTIONAL,   -- Need S
        q-QualMinOffset           INTEGER (1..8)          OPTIONAL    -- Need S
    }                                                     OPTIONAL,   -- Cond
Standalone
    cellAccessRelatedInfo      CellAccessRelatedInfo,
    connEstFailureControl      ConnEstFailureControl      OPTIONAL,   -- Need R
    si-SchedulingInfo          SI-SchedulingInfo          OPTIONAL,   -- Need R
    servingCellConfigCommon    ServingCellConfigCommonSIB OPTIONAL,   -- Need R
    ims-EmergencySupport       ENUMERATED {true}          OPTIONAL,   -- Need R
    eCallOverIMS-Support       ENUMERATED {true}          OPTIONAL,   -- Need R
    ue-TimersAndConstants      UE-TimersAndConstants      OPTIONAL,   -- Need R
    uac-BarringInfo            SEQUENCE {
        uac-BarringForCommon       UAC-BarringPerCatList   OPTIONAL,   -- Need S
        uac-BarringPerPLMN-List    UAC-BarringPerPLMN-List OPTIONAL,   -- Need S
        uac-BarringInfoSetList     UAC-BarringInfoSetList,
        uac-AccessCategory1-SelectionAssistanceInfo CHOICE {
            plmnCommon                 UAC-AccessCategory1-
SelectionAssistanceInfo,
            individualPLMNList         SEQUENCE (SIZE (2..maxPLMN)) OF
                                       UAC-AccessCategory1-
SelectionAssistanceInfo
        }                                                  OPTIONAL    -- Need S
    }                                                      OPTIONAL,   -- Need R
    useFullResumeID            ENUMERATED {true}           OPTIONAL,   -- Need R
    lateNonCriticalExtension   OCTET STRING                OPTIONAL,
    nonCriticalExtension       SIB1-v1610-IEs              OPTIONAL
}

SIB1-v1610-IEs ::=                SEQUENCE {
    idleModeMeasurementsEUTRA-r16     ENUMERATED{true}          OPTIONAL,  -- Need R
    idleModeMeasurementsNR-r16        ENUMERATED{true}          OPTIONAL,  -- Need R
    posSI-SchedulingInfo-r16          PosSI-SchedulingInfo-r16  OPTIONAL,  -- Need R
    nonCriticalExtension              SIB1-v1630-IEs            OPTIONAL
}

SIB1-v1630-IEs ::=                SEQUENCE {
    uac-BarringInfo-v1630             SEQUENCE {
        uac-AC1-SelectAssistInfo-r16    SEQUENCE (SIZE (2..maxPLMN)) OF
                                        UAC-AC1-SelectAssistInfo-r16
    }                                                           OPTIONAL,  -- Need R
    nonCriticalExtension              SIB1-v17xy-IEs            OPTIONAL
}

SIB1-v17xy-IEs ::=         SEQUENCE {
    sl-RelaySupport            ENUMERATED {L2, L3, both}        OPTIONAL,  -- Need R
    nonCriticalExtension       SEQUENCE {}                      OPTIONAL
}

UAC-AccessCategory1-SelectionAssistanceInfo ::=    ENUMERATED {a, b, c}

UAC-AC1-SelectAssistInfo-r16 ::=     ENUMERATED {a, b, c, notConfigured}

-- TAG-SIB1-STOP
-- ASN1STOP
```

FIG. 12

```
-- ASN1START
-- TAG-SIB12-START
SIB12-r16 ::=                 SEQUENCE {
    segmentNumber-r16             INTEGER (0..63),
    segmentType-r16               ENUMERATED {notLastSegment, lastSegment},
    segmentContainer-r16          OCTET STRING
}
SIB12-IEs-r16 ::=             SEQUENCE {
    sl-ConfigCommonNR-r16         SL-ConfigCommonNR-r16,
    lateNonCriticalExtension      OCTET STRING                   OPTIONAL,
    ... ,
    [[
    sl-DiscConfigInfo-r17         SEQUENCE {
        sl-DiscConfigCommon-r17        SL-DiscConfigCommon-r17      OPTIONAL,  -- Need R
        sl-DiscoverySupport-r17        ENUMERATED{relay, non-relay, both} OPTIONAL,  -- Need R
     }                                                            OPTIONAL,    -- Need R
    ]]
}
SL-ConfigCommonNR-r16 ::=        SEQUENCE {
    sl-FreqInfoList-r16                SEQUENCE (SIZE (1..maxNrofFreqSL-r16)) OF SL-FreqConfigCommon-r16 OPTIONAL, -- Need R
    sl-UE-SelectedConfig-r16           SL-UE-SelectedConfig-r16                                    OPTIONAL, -- Need R
    sl-NR-AnchorCarrierFreqList-r16    SL-NR-AnchorCarrierFreqList-r16                             OPTIONAL, -- Need R
    sl-EUTRA-AnchorCarrierFreqList-r16 SL-EUTRA-AnchorCarrierFreqList-r16                          OPTIONAL, -- Need R
    sl-RadioBearerConfigList-r16       SEQUENCE (SIZE (1..maxNrofSLRB-r16)) OF SL-RadioBearerConfig-r16  OPTIONAL, -- Need R
    sl-RLC-BearerConfigList-r16        SEQUENCE (SIZE (1..maxSL-LCID-r16)) OF SL-RLC-BearerConfig-r16    OPTIONAL, -- Need R
    sl-MeasConfigCommon-r16            SL-MeasConfigCommon-r16                                     OPTIONAL, -- Need R
    sl-CSI-Acquisition-r16             ENUMERATED {enabled}                                        OPTIONAL, -- Need R
    sl-OffsetDFN-r16                   INTEGER (1..1000)                                           OPTIONAL, -- Need R
    t400-r16                           ENUMERATED {ms100, ms200, ms300, ms400, ms600, ms1000, ms1500,
                                                 ms2000}                                           OPTIONAL, -- Need R
    sl-MaxNumConsecutiveDTX-r16        ENUMERATED {n1, n2, n3, n4, n6, n8, n16, n32}               OPTIONAL, -- Need R
    sl-SSB-PriorityNR-r16              INTEGER (1..8)                                              OPTIONAL  -- Need R
}
SL-NR-AnchorCarrierFreqList-r16 ::=    SEQUENCE (SIZE (1..maxFreqSL-NR-r16)) OF ARFCN-ValueNR
SL-EUTRA-AnchorCarrierFreqList-r16 ::= SEQUENCE (SIZE (1..maxFreqSL-EUTRA-r16)) OF ARFCN-ValueEUTRA
SL-DiscConfigCommon-r17 ::=            SEQUENCE {
    sl-RelayUE-ConfigCommon-r17          SL-RelayUE-Config-r17,
    sl-RemoteUE-ConfigCommon-r17         SL-RemoteUE-Config-r17
}
-- TAG-SIB12-STOP
-- ASN1STOP
```

FIG. 13

```
-- ASN1START
-- TAG-RRCRECONFIGURATION-START
RRCReconfiguration ::=            SEQUENCE {
    rrc-TransactionIdentifier         RRC-TransactionIdentifier,
    criticalExtensions                CHOICE {
        rrcReconfiguration                RRCReconfiguration-IEs,
        criticalExtensionsFuture          SEQUENCE {}
    }
}
RRCReconfiguration-IEs ::=        SEQUENCE {
...
    lateNonCriticalExtension          OCTET STRING                      OPTIONAL,
    nonCriticalExtension              RRCReconfiguration-v1530-IEs      OPTIONAL
}
RRCReconfiguration-v1530-IEs ::=  SEQUENCE {
...
    nonCriticalExtension              RRCReconfiguration-v1540-IEs      OPTIONAL
}
RRCReconfiguration-v1540-IEs ::=  SEQUENCE {
...
    nonCriticalExtension              RRCReconfiguration-v1560-IEs      OPTIONAL
}
RRCReconfiguration-v1560-IEs ::=  SEQUENCE {
...
    nonCriticalExtension              RRCReconfiguration-v1610-IEs      OPTIONAL
}
RRCReconfiguration-v1610-IEs ::=  SEQUENCE {
...
    nonCriticalExtension              RRCReconfiguration-v17xy-IEs      OPTIONAL
}
RRCReconfiguration-v17xy-IEs ::=  SEQUENCE {
    sl-DiscConfigInfo-r17             SEQUENCE {
       sl-DiscConfig-r17                 SL-DiscConfig-r17                       OPTIONAL,  -- Need R
       sl-DiscoverySupport-r17           ENUMERATED{relay, non-relay, both}      OPTIONAL,  -- Need R
    }                                                                            OPTIONAL,  -- Need R
   nonCriticalExtension               SEQUENCE {}                                OPTIONAL
}
...
SL-DiscConfig-r17 ::=             SEQUENCE {
    sl-RelayUE-Config-r17             SL-RelayUE-Config-r17,
    sl-RemoteUE-Config-r17            SL-RemoteUE-Config-r17
}
-- TAG-RRCRECONFIGURATION-STOP
-- ASN1STOP
```

FIG. 14

Figures 15, 16:
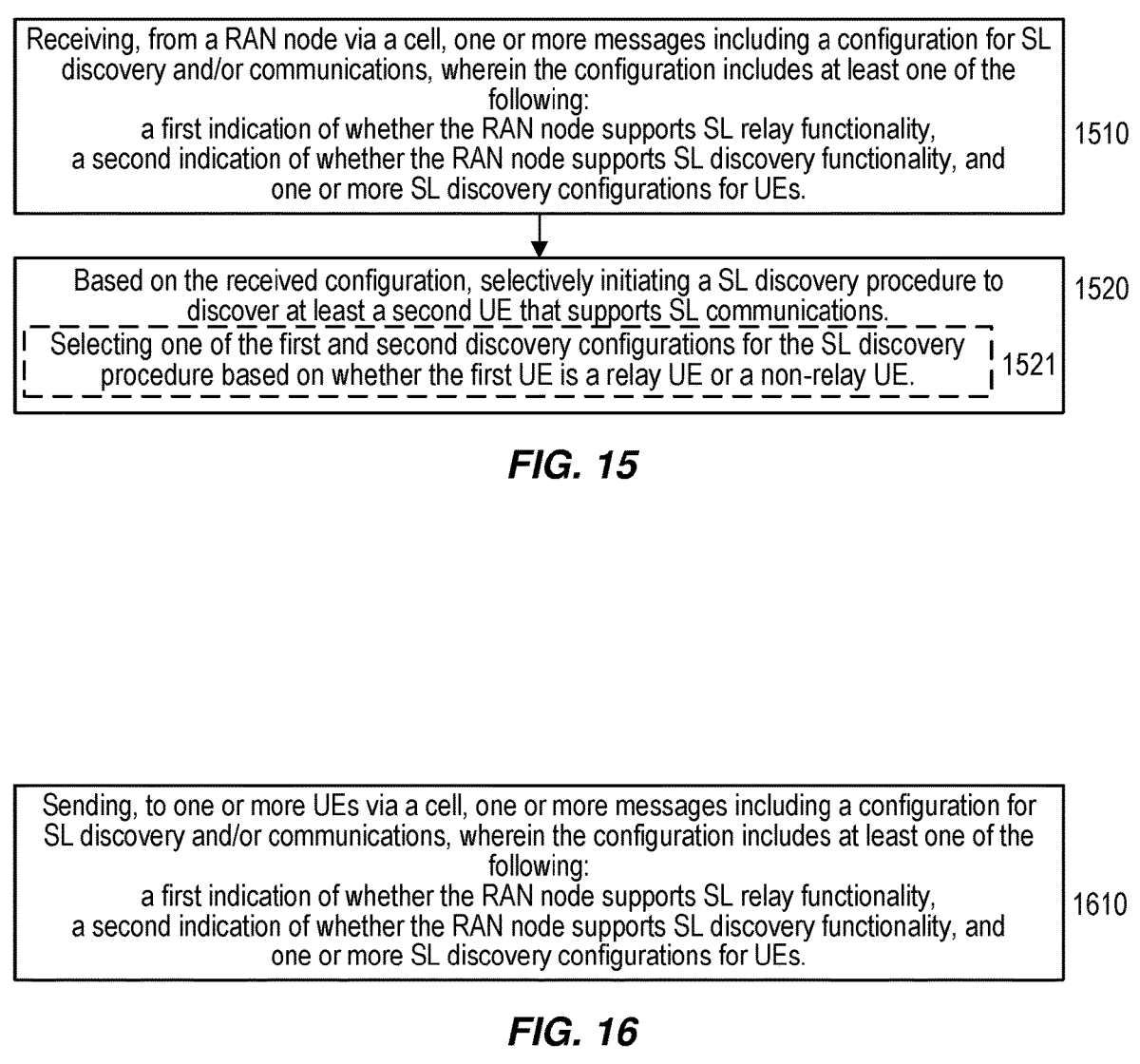

Receiving, from a RAN node via a cell, one or more messages including a configuration for SL discovery and/or communications, wherein the configuration includes at least one of the following:
a first indication of whether the RAN node supports SL relay functionality,
a second indication of whether the RAN node supports SL discovery functionality, and
one or more SL discovery configurations for UEs.

1510

Based on the received configuration, selectively initiating a SL discovery procedure to discover at least a second UE that supports SL communications.

1520

Selecting one of the first and second discovery configurations for the SL discovery procedure based on whether the first UE is a relay UE or a non-relay UE.

Sending, to one or more UEs via a cell, one or more messages including a configuration for SL discovery and/or communications, wherein the configuration includes at least one of the following:
a first indication of whether the RAN node supports SL relay functionality,
a second indication of whether the RAN node supports SL discovery functionality, and
one or more SL discovery configurations for UEs.

INDICATING NETWORK SUPPORT OF VARIOUS SIDELINK (SL) FUNCTIONALITY

TECHNICAL FIELD

The present disclosure generally relates to wireless communication networks, and more specifically to user equipment (UE) that can communicate with other UEs directly rather than (or in addition to) indirect communication via a radio access network (RAN).

BACKGROUND

Currently the fifth generation ("5G") of cellular systems, also referred to as New Radio (NR), is being standardized within the Third-Generation Partnership Project (3GPP). NR is developed for maximum flexibility to support multiple and substantially different use cases. These include enhanced mobile broadband (eMBB), machine type communications (MTC), ultra-reliable low latency communications (URLLC), side-link device-to-device (D2D), and several other use cases.

FIG. 1 illustrates an exemplary high-level view of the 5G network architecture, consisting of a Next Generation RAN (NG-RAN) 199 and a 5G Core (5GC) 198. NG-RAN 199 can include a set of gNodeB's (gNBs) connected to the 5GC via one or more NG interfaces, such as gNBs 100, 150 connected via interfaces 102, 152, respectively. In addition, the gNBs can be connected to each other via one or more Xn interfaces, such as Xn interface 140 between gNBs 100 and 150. With respect the NR interface to UEs, each of the gNBs can support frequency division duplexing (FDD), time division duplexing (TDD), or a combination thereof.

NG-RAN 199 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport.

The NG RAN logical nodes shown in FIG. 1 include a central (or centralized) unit (CU or gNB-CU) and one or more distributed (or decentralized) units (DU or gNB-DU). For example, gNB 100 includes gNB-CU 110 and gNB-DUs 120 and 130. CUs (e.g., gNB-CU 110) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry.

A gNB-CU connects to gNB-DUs over respective F1 logical interfaces, such as interfaces 122 and 132 shown in FIG. 1. The gNB-CU and connected gNB-DUs are only visible to other gNBs and the 5GC as a gNB. In other words, the F1 interface is not visible beyond gNB-CU.

Sidelink (SL) is a type of device-to-device (D2D) communication whereby UEs can communicate with each other directly rather than indirectly via a 3GPP RAN. The first 3GPP standardization of SL was in LTE Rel-12 targeting public safety use cases and proximity-based services (ProSe). Since then, a number of enhancements have been introduced to broaden the use cases that could benefit from D2D technology. For example, the D2D extensions in LTE Rel-14 and Rel-15 include supporting vehicle-to-everything (V2X) communication.

3GPP Rel-16 specifies the NR SL interface. NR Rel-16 SL targets advanced V2X services, which can be categorized into four use case groups: vehicles platooning, extended sensors, advanced driving, and remote driving. The advanced V2X services require a new SL in order to meet the stringent requirements in terms of latency and reliability. The NR SL is designed to provide higher system capacity and better coverage, and to allow for extension to support the future development of even more advanced V2X services and other related services.

Broadcast, groupcast, and unicast transmissions are desirable for the services targeted by NR SL. In groupcast (or multicast), the intended receiver of a message consists of only a subset of the possible recipients in proximity to the transmitter, whereas a unicast message is intended for only one recipient in proximity to the transmitter. For example, in the platooning service there are certain messages that are only of interest of the members of the platoon, for which groupcast can be used. Unicast is a natural fit for use cases involving only a pair of vehicles.

3GPP Rel-17 includes a work item for coverage extension for SL-based communication, including UE-to-network relay for cellular coverage extension and UE-to-UE relay for SL coverage extension. Additionally, improving performance of power-limited UEs (e.g., pedestrian UEs, first responder UEs, etc.) and improving the performance using resource coordination are also important goals for the Rel-17 work.

Two UE-based relay capabilities were studied for NR SL in Rel-17: UE-to-Network (U2N) relay, where a UE extends the network connectivity to another nearby UE by using direct communication; and UE-to-UE (U2U) relay, where a UE uses two direct communication links to connect two UEs in its proximity that otherwise are not able to communicate. U2N relay functionality is fundamental for network coverage extension for public safety in remote areas, for wearable devices tethering in commercial use cases (e.g., sensors, virtual reality headsets), etc. U2U relay functionality was not part of the LTE ProSe specification, and its inclusion on NR ProSe can be beneficial for public safety communications range extension for both in-network and off-network use cases.

LTE U2N relay functionality uses a Layer 3 (L3) architecture in which the relay of data packets via the PC5 interface is performed at the network layer, and UEs connected to a L3 U2N relay are transparent to the network. NR SL U2N relay uses two different architectures: a L3 architecture similar to LTE, and a newly defined architecture in which PC5 relaying occurs within Layer 2 (L2), over the RLC sublayer.

3GPP TR 23.752 (v2.0.0) section 6.6 describes L3-based U2N relay functionality (also referred to as "ProSe 5G U2N Relay") that can be used for both public safety and commercial services. A ProSe 5G U2N Relay UE supports connectivity to the 5GS (i.e., NG-RAN and 5GC) for other UEs that have successfully established a PC5 link to the ProSe 5G U2N Relay UE. 3GPP TR 23.752 (v2.0.0) section 6.7 describes Layer 2 (L2)-based U2N relay functionality, which includes forwarding functionality that can relay any type of traffic over the PC5 interface between two UEs. A L2 U2N Relay UE supports connectivity to the 5GS (i.e., NG-RAN and 5GC) for other UEs that have successfully established a PC5 link to the L2 U2N Relay UE. A UE connected to a L2 U2N relay will be seen by the network as a regular UE, as if it was directly connected to the network. This gives the network control of the connection and services, but requires the definition of several new mechanisms not present or needed in the L3 architecture.

Unless expressly stated otherwise, the term "relay UE" (or "U2N relay UE") will be used herein to refer to both a ProSe 5G U2N Relay UE and a L2 U2N Relay UE. Likewise, the term "remote UE" will be used herein to refer to a UE that has successfully established a PC5 link to a relay UE. Remote UEs can be located within NG-RAN coverage or outside of NG-RAN coverage.

Before a remote UE can communicate via a relay UE, the two UEs must discover each other. In NR SL, a ProSe direct discovery procedure is used by a UE to discover or be discovered by other proximate UE(s) over the PC5 interface, similar to LTE ProSe. The UE can discover other UE(s) with interested application(s) and/or interested group(s) using the ProSe direct discovery procedure. This feature aims to provide a common direct discovery procedure for discovering a 5G ProSe-enabled UE, a 5G ProSe U2N Relay UE, or a 5G ProSe UE-to-UE (U2U) Relay UE. Discovery can also take place on L2 in the case of L2 U2N relay UEs. Additionally, non-relay discovery (also referred to as "5G ProSe Direct Discovery") is under consideration by 3GPP.

SUMMARY

During the current discovery process, however, UEs are not aware of what types of SL discovery is supported by a RAN node (e.g., gNB) serving the coverage area (e.g., cell) in which at least one of the UEs is operating. This can cause various problems, issues, and/or difficulties.

Embodiments of the present disclosure provide specific improvements to SL operation of UEs, such as by providing, enabling, and/or facilitating solutions to overcome exemplary problems summarized above and described in more detail below.

Embodiments include methods (e.g., procedures) for a first UE configured for SL operation in a cell of a RAN (e.g., NG-RAN).

These exemplary methods can include receiving, from a RAN node via the cell, one or more messages including a configuration for SL discovery and/or communications. The configuration includes at least one of the following:

- a first indication of whether the RAN node supports SL relay functionality,
- a second indication of whether the RAN node supports SL discovery functionality, and
- one or more SL discovery configurations for UEs; and These exemplary methods can also include, based on the received configuration, selectively initiating a SL discovery procedure to discover at least a second UE that supports SL communications.

In some embodiments, absence of the first indication indicates that the RAN node does not support SL relay functionality. In some of these embodiments, when present, the first indication can have a first value indicating that the RAN node supports layer-2 (L2) SL relay. In some further variants, when present, the first indication can also have any of the following values (e.g., as an alternative to the first value):

- a second value indicating that the RAN node supports layer-3 (L3) SL relay, and
- a third value indicating that the RAN node supports both L2 and L3 SL relay.

In some embodiments, absence of the second indication indicates that the RAN node does not support SL discovery functionality. In some of these embodiments, the second indication includes separate first and second fields. When present, the first field indicates that that the RAN node supports relay discovery. When present, the second field indicates that the RAN node supports non-relay discovery.

In other of these embodiments, when present, the second indication can have one of the following values:

- a first value indicating that the RAN node supports relay discovery,
- a second value indicating that the RAN node supports non-relay discovery, and
- a third value indicating that the RAN node supports both relay and non-relay discovery.

In some of these embodiments, the following conditions indicate that the RAN node supports non-relay discovery but does provide SL discovery configurations to UEs: the second indication being present and having contents indicating that the RAN node supports non-relay discovery; and absence of SL discovery configurations from the one or more messages.

In some embodiments, when present, the one or more SL discovery configurations include a first discovery configuration for relay UEs and a second discovery configuration for non-relay UEs. In such embodiments, selectively initiating the discovery procedure can include selecting one of the first and second discovery configurations for the discovery procedure based on whether the first UE is a relay UE or a non-relay UE.

In some of these embodiments, each of the first and second SL discovery configurations include one or more of the following:

- indication of one or more supported discovery models;
- how often the UE can send a discovery message based on the supported discovery models;
- one or more radio channel quality thresholds for triggering discovery procedures;
- one or more radio channel quality thresholds for discovering another UE during a discovery procedure;
- discovery resource pools; and
- frequency bands or carriers on which discovery is supported.

In some embodiments, the one or more messages are received from the RAN node as one or more system information blocks (SIBs) broadcast in the cell. In other embodiments, the one or more messages are received from the RAN node as a single unicast RRC message.

Other embodiments include methods (e.g., procedures) for a RAN node to configure UEs for SL operation.

These exemplary method can include sending, to one or more UEs via a cell, one or more messages including a configuration for SL discovery and/or communications. The configuration includes at least one of the following:

- a first indication of whether the RAN node supports SL relay functionality,
- a second indication of whether the RAN node supports SL discovery functionality, and
- one or more SL discovery configurations for UEs.

In various embodiments, the first indication can have any of the characteristics, features, and/or content summarized above for the first indication in relation to UE embodiments.

In various embodiments, the second indication can have any of the characteristics, features, and/or content summarized above for the second indication in relation to UE embodiments.

In various embodiments, the one or more SL discovery configurations can have any of the characteristics, features, and/or content summarized above for the SL discovery configurations in relation to UE embodiments.

In some embodiments, the one or more messages are sent as one or more SIBs broadcast in the cell. In other embodiments, the one or more messages are sent as respective one or more unicast RRC messages to the one or more UEs.

Other embodiments include UEs (e.g., wireless devices, NSPS devices, etc.) and RAN nodes (e.g., base stations, eNBs, gNBs, en-gNBs, etc.) configured to perform operations corresponding to any of the exemplary methods described herein. Other embodiments include non-transitory, computer-readable media storing program instructions that, when executed by processing circuitry, configure such UEs and RAN nodes to perform operations corresponding to any of the exemplary methods described herein.

These and other embodiments described herein provide techniques for a RAN node to signal network support for various SL discovery-related functionality to UEs in a cell, e.g., via unicast or broadcast. By receiving such information about the RAN node's capabilities, a UE can determine whether to initiate a SL discovery procedure and/or what configuration to apply when initiating the SL discovery procedure. In this manner, embodiments improve SL communications between UEs by facilitating easier discovery of other SL-capable UEs.

These and other objects, features, and advantages of embodiments of the present disclosure will become apparent upon reading the following Detailed Description in view of the Drawings briefly described below.

BRIEF DESCRIPTION OF THE DRAWINGS

FIGS. 11-12 show two exemplary ASN.1 data structures for a system information block 1 (SIB1) that includes configuration information for SL discovery and/or communications, according to various embodiments of the present disclosure.

FIG. 13 shows an exemplary ASN.1 data structures for a SIB12 that include configuration information for SL discovery and/or communications, according to various embodiments of the present disclosure.

FIG. 14 shows an exemplary ASN.1 data structure for an RRCReconfiguration message that includes configuration information for SL discovery and/or communications, according to various embodiments of the present disclosure.

FIG. 15 shows a flow diagram of an exemplary method (e.g., procedure) for a UE (e.g., wireless device), according to various embodiments of the present disclosure.

FIG. 16 shows a flow diagram of an exemplary method (e.g., procedure) for a RAN node (e.g., base station), according to various embodiments of the present disclosure.

DETAILED DESCRIPTION

Figure 1:
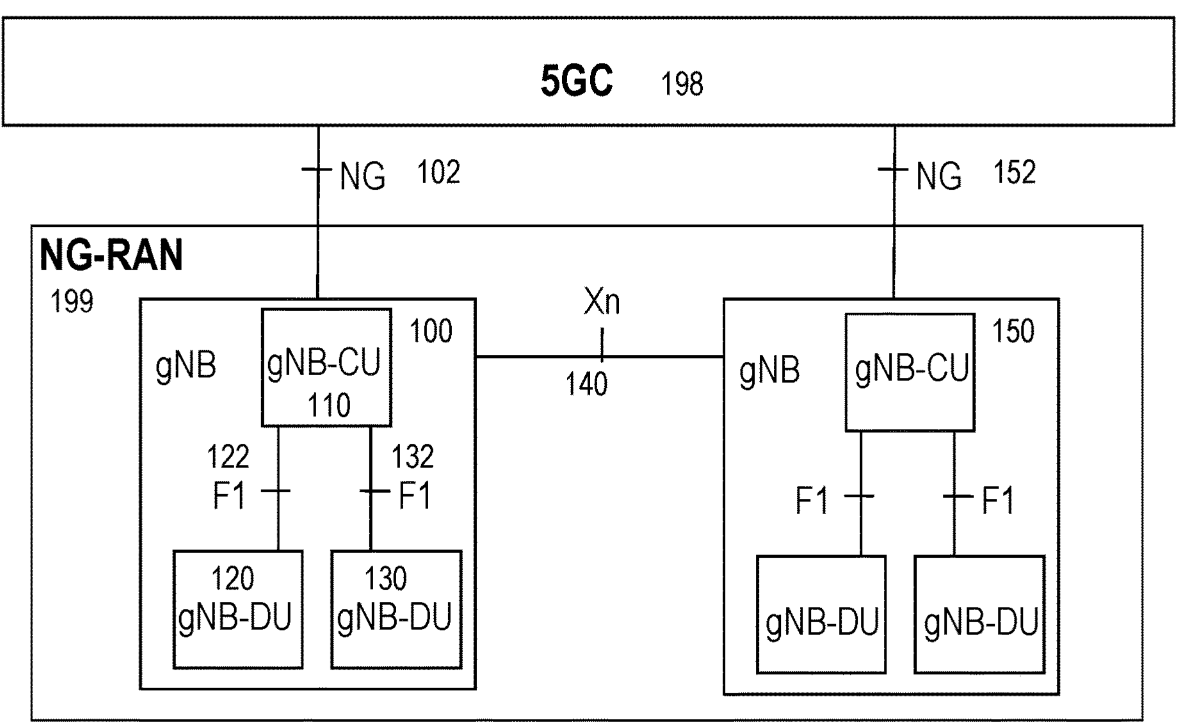
FIG. 1 illustrates a high-level views of an exemplary 5G/NR network architecture.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided as examples to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objects, features, and advantages of the enclosed embodiments will be apparent from the following description.

Furthermore, the following terms are used throughout the description given below:

- Radio Node: As used herein, a "radio node" can be either a "radio access node" or a "wireless device."
- Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point (TP), a transmission reception point (TRP), a remote radio unit (RRU or RRH), and a relay node.
- Core Network Node: As used herein, a "core network node" is any type of node in a core network. Some examples of a core network node include, e.g., a Mobility Management Entity (MME), a serving gateway (SGW), a PDN Gateway (P-GW), a Policy and Charging Rules Function (PCRF), an access and mobility management function (AMF), a session management function (SMF), a user plane function (UPF), a Charging Function (CHF), a Policy Control Function (PCF), an Authentication Server Function (AUSF), a location management function (LMF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Base station: As used herein, a "base station" may comprise a physical or a logical node transmitting or controlling the transmission of radio signals, e.g., eNB, gNB, ng-eNB, en-gNB, centralized unit (CU)/distributed unit (DU), transmitting radio network node, transmission point (TP), transmission reception point (TRP), remote radio head (RRH), remote radio unit (RRU), Distributed Antenna System (DAS), relay, etc.

The above definitions are not meant to be exclusive. In other words, various ones of the above terms may be explained and/or described elsewhere in the present disclosure using the same or similar terminology. Nevertheless, to the extent that such other explanations and/or descriptions conflict with the above definitions, the above definitions should control.

Note that the description given herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

Figure 2:
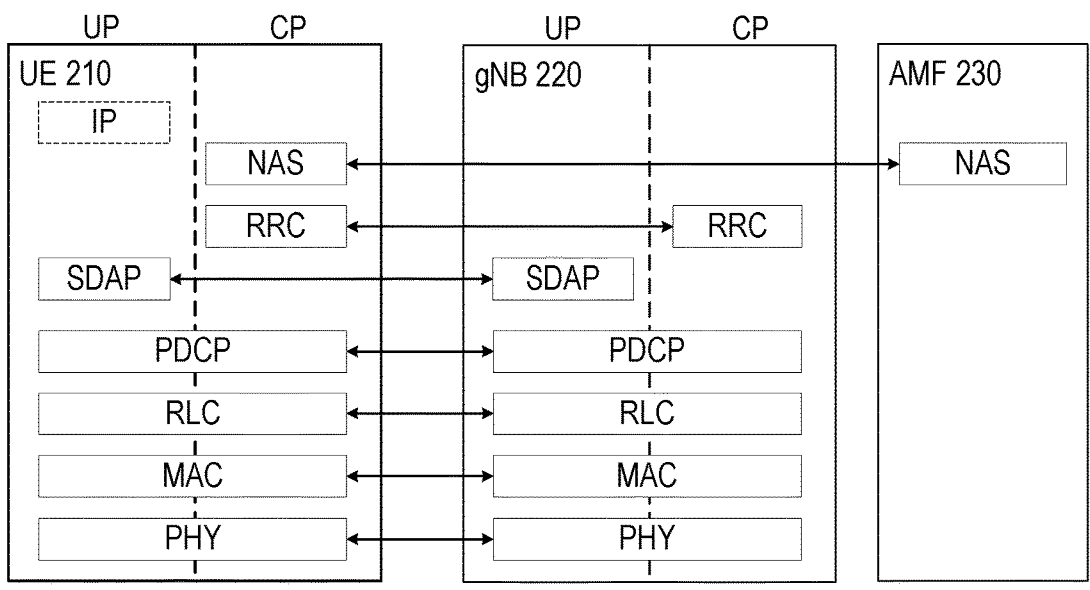
FIG. 2 shows an exemplary configuration of NR user plane (UP) and control plane (CP) protocol stacks.

FIG. 2 shows an exemplary configuration of NR user plane (UP) and control plane (CP) protocol stacks between a UE (210), a gNB (220), and an access and mobility management function (AMF, 230) in the 5GC. The Physical (PHY), Medium Access Control (MAC), Radio Link Control (RLC), and Packet Data Convergence Protocol (PDCP) layers between the UE and the gNB are common to UP and CP. The PDCP layer provides ciphering/deciphering, integrity protection, sequence numbering, reordering, and duplicate detection for both CP and UP. In addition, PDCP provides header compression and retransmission for UP data.

On the UP side, Internet protocol (IP) packets arrive to the PDCP layer as service data units (SDUs), and PDCP creates protocol data units (PDUs) to deliver to RLC. The Service Data Adaptation Protocol (SDAP) layer handles quality-of-service (QoS) including mapping between QoS flows and Data Radio Bearers (DRBs) and marking QoS flow identifiers (QFI) in UL and DL packets. The RLC layer transfers PDCP PDUs to the MAC through logical channels (LCH). RLC provides error detection/correction, concatenation, segmentation/reassembly, sequence numbering, reordering of data transferred to/from the upper layers. The MAC layer provides mapping between LCHs and PHY transport channels, LCH prioritization, multiplexing into or demultiplexing from transport blocks (TBs), hybrid ARQ (HARQ) error correction, and dynamic scheduling (on gNB side). The PHY layer provides transport channel services to the MAC layer and handles transfer over the NR radio interface, e.g., via modulation, coding, antenna mapping, and beam forming.

On CP side, the non-access stratum (NAS) layer is between UE and AMF and handles UE/gNB authentication, mobility management, and security control. The RRC layer sits below NAS in the UE but terminates in the gNB rather than the AMF. RRC controls communications between UE and gNB at the radio interface as well as the mobility of a UE between cells in the NG-RAN. RRC also broadcasts system information (SI) and performs establishment, configuration, maintenance, and release of DRBs and Signaling Radio Bearers (SRBs) and used by UEs. Additionally, RRC controls addition, modification, and release of carrier aggregation (CA) and dual-connectivity (DC) configurations for UEs. RRC also performs various security functions such as key management.

After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE's radio is active on a discontinuous reception (DRX) schedule configured by upper layers. During DRX active times, an RRC_IDLE UE receives SI broadcast in the cell where the UE is camping, performs measurements of neighbor cells to support cell reselection, and monitors a paging channel on PDCCH for pages from 5GC via gNB. An NR UE in RRC_IDLE state is not known to the gNB serving the cell where the UE is camping. However, NR RRC includes an RRC_INACTIVE state in which a UE is known (e.g., via UE context) by the serving gNB. RRC_INACTIVE has some properties similar to a "suspended" condition used in LTE.

DRX functionality is also used by RRC_CONNECTED UEs. This allows a UE to turn off at least some of its receiver circuitry when no incoming data is expected, which helps reduce the energy consumption. When configured, the DRX functionality controls the expected UE behavior in terms of reception and processing of transmissions. Similar to RRC_IDLE DRX, RRC_CONNECTED DRX includes an Active Time (also referred to as Active Time state or ACTIVE state), in which the UE is expected to receive and process incoming transmissions as appropriate. For example, the UE is expected to decode the downlink (DL) control channels, process grants, etc. When the UE is not in Active Time (i.e., the UE is in Inactive mode), there is no expectation by the network for the UE to receive and process transmissions.

Figure 3:
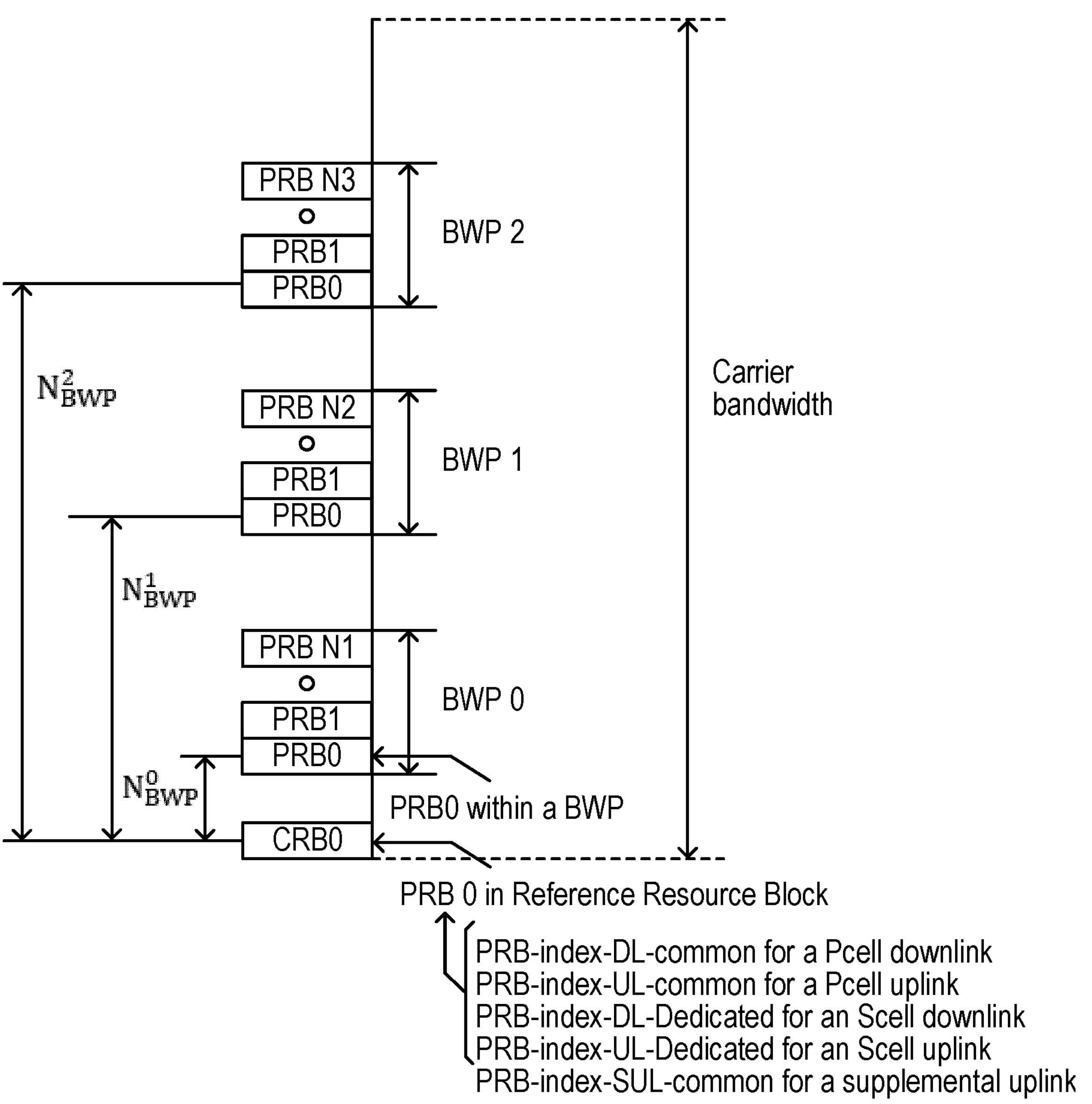
FIG. 3 shows an exemplary frequency-domain configuration for an NR UE.

FIG. 3 shows an exemplary frequency-domain configuration for an NR UE. In Rel-15 NR, a UE can be configured with up to four carrier bandwidth parts (BWPs) in the DL with a single DL BWP being active at a given time. A UE can be configured with up to four BWPs in the UL with a single UL BWP being active at a given time. If a UE is configured with a supplementary UL, the UE can be configured with up to four additional BWPs in the supplementary UL, with a single supplementary UL BWP being active at a given time. In the exemplary arrangement of FIG. 5, the UE is configured with three DL (or UL) BWPs, labelled BWP 0-2, respectively.

Common RBs (CRBs) are numbered from 0 to the end of the carrier bandwidth. Each BWP configured for a UE has a common reference of CRB0 (as shown in FIG. 3), such that a configured BWP may start at a CRB greater than zero. CRB0 can be identified by one of the following parameters provided by the network:

- PRB-index-DL-common for DL in a primary cell (PCell, e.g., PCell or PSCell);
- PRB-index-UL-common for UL in a PCell;
- PRB-index-DL-Dedicated for DL in a secondary cell (SCell);
- PRB-index-UL-Dedicated for UL in an SCell; and
- PRB-index-SUL-common for a supplementary UL.

In this manner, a UE can be configured with a narrow BWP (e.g., 10 MHz) and a wide BWP (e.g., 100 MHz), each starting at a particular CRB, but only one BWP can be active for the UE at a given point in time. In the arrangement shown in FIG. 5, BWPs 0-2 start at CRBs $N^0_{BWP}$, $N^1_{BWP}$, and $N^2_{BWP}$, respectively. Within a BWP, PRBs are defined and numbered in the frequency domain from 0 to $$N^{size}_{BWP,i} - 1,$$

where i is the index of the particular BWP for the carrier. In the arrangement shown in FIG. 5, BWPs 0-2 include PRBs 0 to N1, N2, and N3, respectively.

Similar to LTE, each NR resource element (RE) corresponds to one OFDM subcarrier during one OFDM symbol interval. NR supports various SCS values $\Delta f=(15\times 2^{\mu})$ kHz, where $\mu \in (0, 1, 2, 3, 4)$ are referred to as "numerologies." Numerology $\mu=0$ (i.e., $\phi f=15$ kHz) provides the basic (or reference) SCS that is also used in LTE. The symbol duration, cyclic prefix (CP) duration, and slot duration are inversely related to SCS or numerology. For example, there is one (1-ms) slot per subframe for $\Delta f=15$ kHz, two 0.5-ms slots per subframe for $\Delta f=30$ kHz, etc. In addition, the maximum carrier bandwidth is directly related to numerology according to $2^{\mu}*50$ MHz. Table 1 below summarizes the supported NR numerologies and associated parameters. Different DL and UL numerologies can be configured by the network.

TABLE 1

| μ | Δf = $2^{\mu} \cdot 15$ (kHz) | Cyclic prefix (CP) | CP duration | Symbol duration | Symbol + CP | Slot duration | Max carrier BW |
|---|---|---|---|---|---|---|---|
| 0 | 15 | Normal | 4.69 μs | 66.67 μs | 71.35 μs | 1 ms | 50 MHz |
| 1 | 30 | Normal | 2.34 μs | 33.33 μs | 35.68 μs | 0.5 ms | 100 MHz |
| 2 | 60 | Normal, Extended | 1.17 μs | 16.67 μs | 17.84 μs | 0.25 ms | 200 MHz |
| 3 | 120 | Normal | 0.59 μs | 8.33 μs | 8.92 μs | 125 μs | 400 MHz |
| 4 | 240 | Normal | 0.29 μs | 4.17 μs | 4.46 μs | 62.5 μs | 800 MHz |

Figure 4:
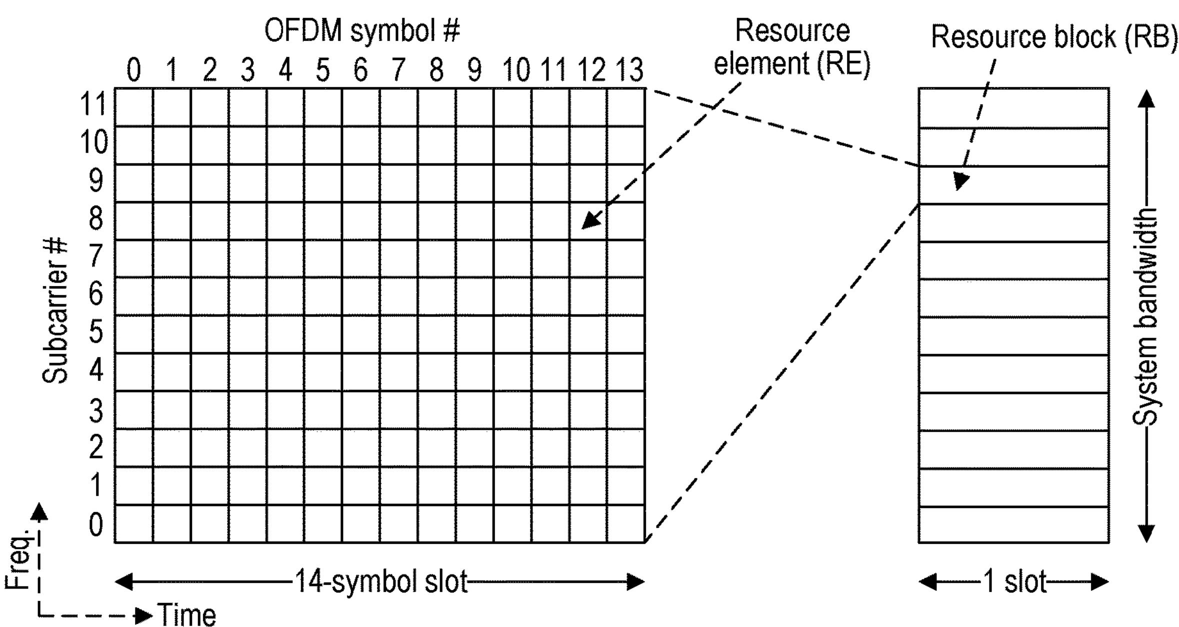
FIG. 4 shows an exemplary time-frequency resource grid for an NR slot.

FIG. 4 shows an exemplary time-frequency resource grid for an NR slot. As illustrated in FIG. 4, a resource block (RB) consists of a group of 12 contiguous OFDM subcarriers for a duration of a 14-symbol slot. Similar to LTE, a resource element (RE) consists of one subcarrier in one slot. An NR slot can include 14 OFDM symbols for normal cyclic prefix and 12 symbols for extended cyclic prefix. An NR slot can also be arranged with various combinations of UL and DL symbols. Options can include DL-only slots (i.e., no UL transmission) with on-time (symbol 0) or late (symbol >0) starts, "DL-heavy" slots (e.g., one UL symbol), and "UL-heavy" slot with a single DL symbol carrying DL control information. Various guard periods before initial DL symbols ($T_{UL-DL}$) and before initial UL symbols ($T_{DL-UL}$) can also be used.

In addition, NR includes a Type-B scheduling, also known as "mini-slots." These are shorter than slots, typically ranging from one symbol up to one less than the number of symbols in a slot (e.g., 11 or 13), and can start at any symbol of a slot. Mini-slots can be used if the transmission duration of a slot is too long and/or the occurrence of the next slot start (slot alignment) is too late. Applications of mini-slots include unlicensed spectrum and latency-critical transmission (e.g., URLLC). However, mini-slots are not service-specific and can also be used for eMBB or other services.

In NR, the physical downlink control channel (PDCCH) transmitted by a gNB is confined to a region containing a particular number of symbols and a particular number of subcarriers, referred to as the control resource set (CORESET). For example, the CORESET can include the first two symbols of a slot and each of the remaining 12 symbols can contain physical data channels (PDCH), i.e., either DL (PDSCH) or UL (PUSCH). Depending on specific CORESET configuration, however, the first two slots can also carry PDSCH or other information, as required.

A CORESET includes multiple RBs (i.e., multiples of 12 REs) in the frequency domain and 1-3 OFDM symbols in the time domain, as further defined in 3GPP TS 38.211 § 7.3.2.2. The smallest unit used for defining CORESET is resource element group (REG), which spans one PRB in frequency and one OFDM symbol in time. A CORESET is functionally similar to the control region in LTE subframe. In NR, however, each REG consists of all 12 REs of one OFDM symbol in an RB, whereas an LTE REG includes only four REs. Like in LTE, the CORESET time domain size can be indicated by the physical control format indicator (CFI) channel (PCFICH). In LTE, the frequency bandwidth of the control region is fixed (i.e., to the total system bandwidth), whereas in NR, the frequency bandwidth of the CORESET is variable. CORESET resources can be indicated to a UE by radio resource control (RRC) signaling.

In addition to PDCCH, each REG in a CORESET contains demodulation reference signals (DM-RS) to aid in the estimation of the radio channel over which that REG was transmitted. When transmitting the PDCCH, a precoder can be used to apply weights at the transmit antennas based on some knowledge of the radio channel prior to transmission. It is possible to improve channel estimation performance at the UE by estimating the channel over multiple REGs that are proximate in time and frequency, if the precoder used at the transmitter for the REGs is not different. To assist the UE with channel estimation, multiple REGs can be grouped together to form a REG bundle, and the REG bundle size for a CORESET (i.e., 2, 3, or 5 REGs) can be indicated to the UE. The UE can assume that any precoder used for the transmission of the PDCCH is the same for all the REGs in a REG bundle.

An NR control channel element (CCE) consists of six REGs. These REGs may either be contiguous or distributed in frequency. When the REGs are distributed in frequency, the CORESET is said to use interleaved mapping of REGs to a CCE, while if the REGs are contiguous in frequency, a non-interleaved mapping is said to be used. Interleaving can provide frequency diversity. Not using interleaving is beneficial for cases where knowledge of the channel allows the use of a precoder in a particular part of the spectrum improve the SINR at the receiver.

Similar to LTE, NR data scheduling can be performed dynamically, e.g., on a per-slot basis. In each slot, the base station (e.g., gNB) transmits downlink control information (DCI) over PDCCH that indicates which UE is scheduled to receive data in that slot, as well as which RBs will carry that data. A UE first detects and decodes DCI and, if the DCI includes DL scheduling information for the UE, receives the corresponding PDSCH based on the DL scheduling information. DCI formats 1_0 and 1_1 are used to convey PDSCH scheduling.

Likewise, DCI on PDCCH can include UL grants that indicate which UE is scheduled to transmit data on PUCCH in that slot, as well as which RBs will carry that data. A UE first detects and decodes DCI and, if the DCI includes an uplink grant for the UE, transmits the corresponding PUSCH on the resources indicated by the UL grant. DCI formats 0_0 and 0_1 are used to convey UL grants for PUSCH, while Other DCI formats (2_0, 2_1, 2_2 and 2_3) are used for other purposes including transmission of slot format information, reserved resource, transmit power control information, etc.

A DCI includes a payload complemented with a Cyclic Redundancy Check (CRC) of the payload data. Since DCI is sent on PDCCH that is received by multiple UEs, an identifier of the targeted UE needs to be included. In NR, this is done by scrambling the CRC with a Radio Network Temporary Identifier (RNTI) assigned to the UE. Most commonly, the cell RNTI (C-RNTI) assigned to the targeted UE by the serving cell is used for this purpose.

DCI payload together with an identifier-scrambled CRC is encoded and transmitted on the PDCCH. Given previously configured search spaces, each UE tries to detect a PDCCH addressed to it according to multiple hypotheses (also referred to as "candidates") in a process known as "blind decoding." PDCCH candidates span 1, 2, 4, 8, or 16 CCEs, with the number of CCEs referred to as the aggregation level (AL) of the PDCCH candidate. If more than one CCE is used, the information in the first CCE is repeated in the other CCEs. By varying AL, PDCCH can be made more or less robust for a certain payload size. In other words, PDCCH link adaptation can be performed by adjusting AL. Depending on AL, PDCCH candidates can be located at various time-frequency locations in the CORESET.

A hashing function can be used to determine the CCEs corresponding to PDCCH candidates that a UE must monitor within a search space set. The hashing is done differently for different UEs. In this manner, CCEs used by the UEs are randomized and the probability of collisions between multiple UEs having messages included in a CORESET is reduced. Once a UE decodes a DCI, it de-scrambles the CRC with RNTI(s) that is(are) assigned to it and/or associated with the particular PDCCH search space. In case of a match, the UE considers the detected DCI as being addressed to it, and follows the instructions (e.g., scheduling information) in the DCI.

For example, to determine the modulation order, target code rate, and TB size(s) for a scheduled PDSCH transmission, the UE first reads the 5-bit modulation and coding scheme field ($I_{MCS}$) in the DCI (e.g., formats 1_0 or 1_1) to determine the modulation order ($Q_m$) and target code rate (R) based on the procedure defined in 3GPP TS 38.214 V15.0.0 clause 5.1.3.1. Subsequently, the UE reads the redundancy version field (rv) in the DCI to determine the redundancy version. Based on this information together with the number of layers (u) and the total number of allocated PRBs before rate matching ($n_{PRB}$), the UE determines the Transport Block Size (TBS) for the PDSCH according to the procedure defined in 3GPP TS 38.214 V15.0.0 clause 5.1.3.2. Similar techniques can be used by the UE for PUSCH transmission scheduled by DCI (e.g., formats 0_0 or 0_1).

In both LTE and NR, UEs transmit UCI (Uplink Control Information) UEs on the physical UL control channel (PUCCH). For example, UCI can include HARQ feedback, CSI (Channel State Information) feedback, and SR (Scheduling Requests). Currently there are five different PUCCH formats (0-4) defined for carrying different types of UCI, where the sizes of the various formats range from one to 14 OFDM symbols.

NR supports two types of pre-configured resource assignments, both of which are similar to existing LTE semi-persistent scheduling (SPS) with some enhancements such as support for transport block (TB) repetitions. In type 1, UL data transmission with configured grant is only based on RRC (re)configuration without any L1 signaling. Type 2 is similar to the LTE SPS feature. UL data transmission with configured grant is based on both RRC configuration and layer-1 (L1) signaling for activation/deactivation of the grant. In this case, a gNB needs to explicitly activate the configured resources on PDCCH and the UE confirms reception of the activation/deactivation grant using a MAC control element.

Figure 5:
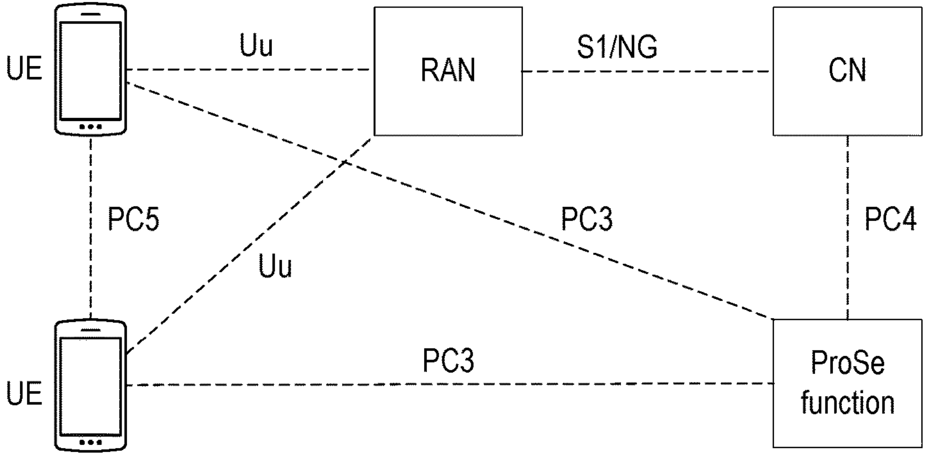
FIG. 5 shows an exemplary arrangement of interfaces between two V2X UEs and a RAN.

A vehicle-to-everything (V2X) UE can support unicast communication via the uplink/downlink radio interface (also referred to as "Uu") to a 3GPP RAN, such as the LTE Evolved-UTRAN (E-UTRAN) or the NG-RAN. A V2X UE can also support SL unicast over the PC5 interface. FIG. 5 shows an exemplary arrangement of interfaces between two V2X UEs and a RAN. In addition to Uu and PC5 interfaces, the V2X UEs can communicate with a ProSe (PROximity-based SErvices) network function (NF) via respective PC3 interfaces. Communication with the ProSe NF requires a UE to establish a connection with the RAN, either directly via the Uu interface or indirectly via PC5 and another UE's Uu interface. The ProSe function provides the UE various information for network related actions, such as service authorization and provisioning of PLMN-specific information (e.g., security parameters, group IDs, group IP addresses, out-of-coverage radio resources, etc.).

Figures 6, 7:
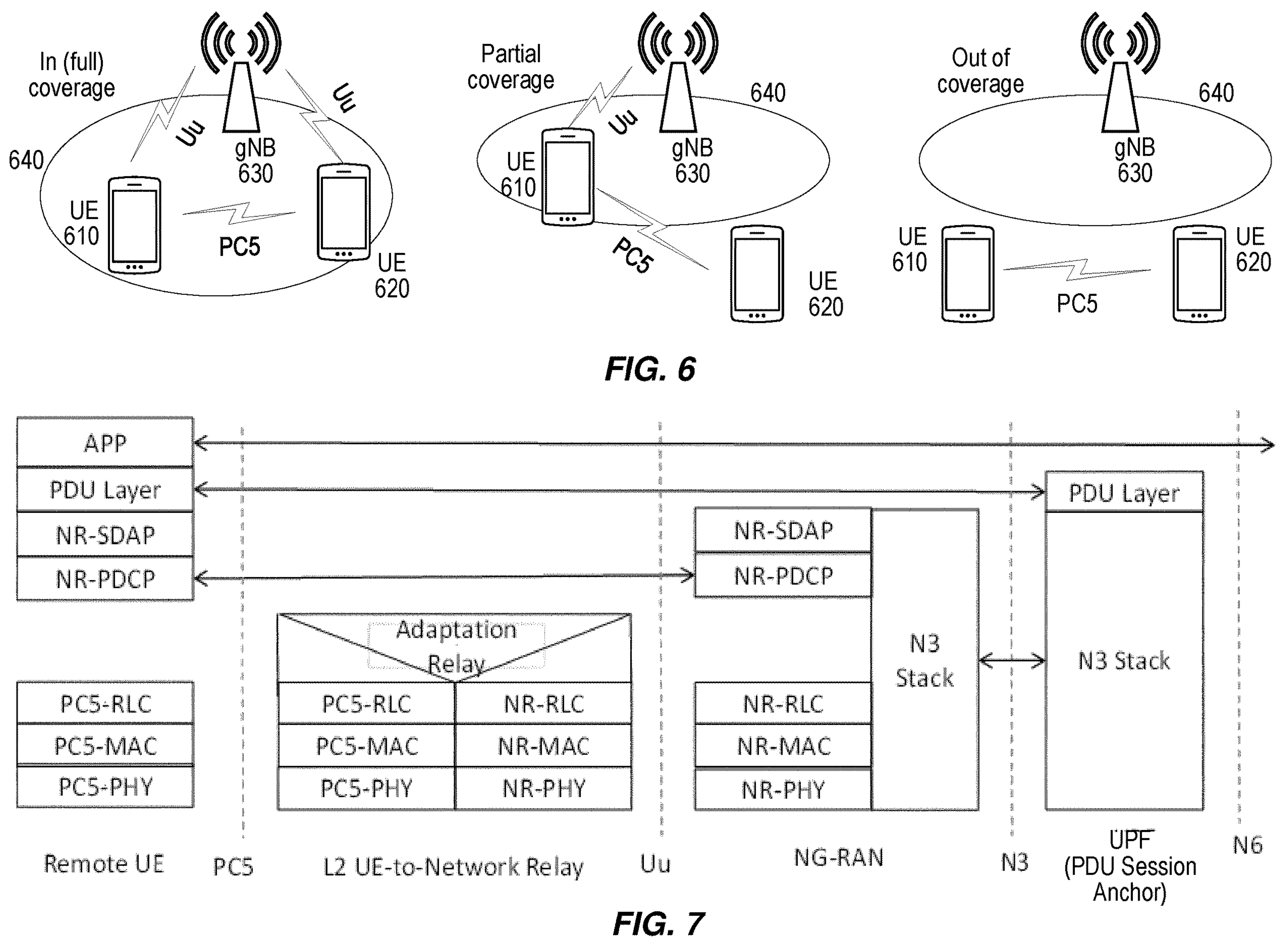
FIG. 6 shows three exemplary network coverage scenarios for two UEs and a gNB serving a cell.
FIGS. 7-8 illustrate exemplary SL UP and CP protocol stacks, respectively, including L2 U2N relay functionality.

FIG. 6 shows three exemplary network coverage scenarios for two UEs (610, 620) and a gNB (630) serving a cell (640). In the full coverage scenario (left), both UEs are in the coverage of the cell, such that they both can communicate with the gNB via respective Uu interfaces and directly with each other via the PC5 interface. In the partial coverage scenario (center), only one of the UEs (i.e., 610) is in coverage of the cell, but the out-of-coverage UE (i.e., 620) can still communicate with the gNB indirectly via the PC5 interface with the in-coverage UE. In the out-of-coverage scenario, both UEs can only communicate with each other via the PC5 interface.

In general, the term "SL standalone" refers to direct communication between two SL-capable UEs (e.g., via PC5) in which source and destination are the UEs themselves. In contrast, the term "SL relay" refers to indirect communication between a network node and a remote UE via a first interface (e.g., Uu) between the network node an intermediate (or relay) UE and a second interface (e.g., PC5) between the relay UE and the remote UE. In this case the relay UE is neither the source nor the destination.

In general, an "out-of-coverage UE" is one that cannot establish a direct connection to the network and must communicate via either SL standalone or SL relay. A "peer UE" refers to a UE that can communicate with the out-of-coverage UE via SL standalone or SL relay (in which case the peer UE is also a relay UE).

UEs that are in coverage can be configured (e.g., by a gNB) via RRC signaling and/or system information. Out-of-coverage UEs rely on a (pre-)configuration available in their SIMs. These pre-configurations are generally static but can be updated by the network when a UE is in coverage.

NR SL radio resources are organized in REs, RBs, slots, and BWPs in a similar manner as UL/DL radio resources. SL supports transmission using 7-14 OFDM symbols, but any particular carrier is configured with only one transmission length at any time. SL radio resources also utilize sub-channels, which are collections of adjacent REs spanning an integer number of RBs in one transmission length (e.g., one slot). The sub-channel is the smallest unit that can be allocated for a normal SL transmission. Sub-channel size is (pre)configured. SL resources are also organized as resource pools, which are collections of sub-channels adjacent in frequency but not necessarily in time. A resource pool is (pre)configured.

Various physical channels and reference signals are available on NR SL. A Physical Sidelink Shared Channel (PSSCH) is similar to PDSCH in the DL. PSSCH is transmitted by a SL transmitter UE to convey SL transmission data, system information blocks (SIBs) for RRC configuration, and partial SL control information (SCI). A Physical Sidelink feedback channel (PSFCH) is transmitted by a SL receiver UE for unicast and groupcast, and conveys 1 bit of information over 1 RB for the HARQ (ACK/NACK). Channel state information (CSI) is carried in a medium access control (MAC) control element (CE) over the PSSCH instead of via PSFCH.

Additionally, the Physical Sidelink Common Control Channel (PSCCH) is similar to PDCCH for DL. When traffic to be sent to a SL receiver UE arrives at a SL transmitter UE, the SL transmitter UE should first send the PSCCH to convey a first part of the SCI to be decoded by any UE for the channel sensing purpose. The first part of the SCI indicates reserved time-frequency resources for transmissions, demodulation reference signal (DMRS) pattern and antenna port, etc. The second part of the SCI is sent via PSSCH, as discussed above.

The SL Primary/Secondary Synchronization Signals (S-PSS/S-SSS) are similar to DL primary and secondary synchronization signals (PSS/SSS). Through detecting the S-PSS and S-SSS, a UE is able to identify the SL synchronization identity (SSID) from the UE sending the S-PSS/S-SSS, and determine characteristics of the UE sending the S-PSS/S-SSS. There are 2 S-PSS sequences and 336 S-SSS sequences forming a total of 672 SSIDs in a cell. Note that a UE sending the S-PSS/S-SSS is not necessarily otherwise involved in SL transmissions. A node (UE/eNB/gNB) sending the S-PSS/S-SSS is called a synchronization source.

The Physical Sidelink Broadcast Channel (PSBCH) is transmitted along with the S-PSS/S-SSS as a synchronization signal/PSBCH block (SSB). The SSB has the same numerology as PSCCH/PSSCH on that carrier, and an SSB should be transmitted within the bandwidth of the configured BWP. The PSBCH conveys information related to synchronization, such as the direct frame number (DFN), indication of the slot and symbol level time resources for sidelink transmissions, in-coverage indicator, etc. The SSB is transmitted periodically every 160 ms.

Additionally, reference signals such as DMRS, PT-RS, CSI-RS, etc. that are supported on NR DL/UL are also supported on NR SL. Like NR DL, PT-RS is only applicable for transmission in frequency range 2 (FR2) spectrum.

As mentioned above, NR SL supports two-part SCI. A first part of the SCI is sent on the PSCCH and can be read by all UEs. The second part of the SCI is sent on PSSCH and includes scheduling and control information such as an 8-bit source identity (ID), a 16-bit destination ID, new data indication (NDI), redundancy version (RV), and HARQ process ID. The second part is intended for particular receiver UE Two resource allocation modes are supported for NR SL transmissions between UEs. In NR SL resource allocation mode 2, the resource allocation is performed by UE itself, e.g., autonomously based on sensing the carrier/resource pool for availability. In particular, the UE determines available resources by decoding sidelink control information (SCI) received from other UEs and/or energy sensing and selects a set of idle/available resources to use for its SL transmission. This can be done in a similar manner as described above in relation to DCI.

When traffic arrives at a transmitter UE, this transmitter UE autonomously selects resources for the PSCCH and the PSSCH. To further minimize the latency of the feedback HARQ ACK/NACK transmissions and subsequent retransmissions, a transmitter UE may also reserve retransmission resources for PSCCH/PSSCH. To further enhance the probability of successful single-shot TB decoding and reduce retransmissions, a transmitter UE may repeat the TB transmission along with the initial TB transmission. This mechanism is also known as blind retransmission. As a result, when traffic arrives at a transmitter UE, then this transmitter UE should select resources for the following:

PSSCH associated with the PSCCH for initial transmission and blind retransmission; and PSSCH associated with the PSCCH for retransmissions.

How to prevent different transmitter UEs from selecting the same resources is an important issue for Mode 2. A resource selection procedure based on channel sensing is used. The channel sensing involves measuring RSRP on different sub-channels and requires knowledge of the different UEs' power levels of DMRS on the PSSCH or on the PSCCH, depending on the configuration. This information is known only after receiving SCI from (all) other UEs.

Resource reservation allows a UE to predict the utilization of the radio resources in the future. For example, a UE can obtain information about potential future transmissions by listening to the current transmissions of another UE. This information can be used by the UE to avoid collisions when selecting its own resources. As a more specific example, a UE predicts the future utilization of the radio resources by reading received booking messages and then schedules its transmissions to avoid using the same resources.

In NR SL resource allocation mode 1, all SL transmissions between UEs are scheduled by the network (e.g., a serving gNB) using a configured grant or a dynamic grant. A gNB can configure Mode 1 or Mode 2 for an in-coverage UE, but an out-of-coverage UE can only use Mode 2.

Dynamic grants in Mode 1 are based on data being available for SL transmission, which triggers a buffer status report (BSR) by the UE having the data to send. If the UE already has an UL grant with enough resources, it will send the BSR to the gNB using these resources. Otherwise, it will trigger a SL scheduling request (SR) and send BSR on resources indicated by the UL grant in the responsive DCI from the gNB. After receiving the BSR, the gNB performs resource allocation and provides a SL grant to UE via downlink control information (DCI).

During the resource request procedure, a gNB may allocate a SL radio network temporary identifier (SL-RNTI) to the transmitter UE. If this sidelink resource request is granted by a gNB, then a gNB indicates the resource allocation for the PSCCH and the PSSCH in the downlink control information (DCI) conveyed by PDCCH with CRC scrambled with the SL-RNTI. When a transmitter UE receives such a DCI, a transmitter UE can obtain the grant only if the scrambled CRC of DCI can be successfully solved by the assigned SL-RNTI. A transmitter UE then indicates the time-frequency resources and the transmission scheme of the allocated PSSCH in the PSCCH, and launches the PSCCH and the PSSCH on the allocated resources for sidelink transmissions, and inserts a CRC in the SCI without any scrambling. When a grant is obtained from a gNB, a transmitter UE can only transmit a single TB. As a result, this kind of grant is suitable for traffic with a loose latency requirement This SR/BSR scheme for SL (e.g., PC5 interface) follows similar principles as the SR/BSR scheme for UL/DL (e.g., Uu interface). For example, like Uu, NR SL also supports configuration of multiple dedicated SL SRs. Each SR configuration can be mapped to one or more logical channels, so that the UE uses the specific SR configuration depending on the logical channel (as indicated by a logical channel ID, or LCID) associated with the data available in the SL buffer. In addition, the UE may also use SL BSR to indicate the amount of data available in the SL buffer. Similar to Uu procedures, if there are insufficient UL resources available for the UE to transmit the triggered SL BSR, the UE will first send a SL SR and the network (e.g., gNB) will provide an UL grant for transmitting the BSR.

The network (e.g., serving gNB) can provide a UE with configured SL grant via radio resource control (RRC) configuration. Configured SL grants typically allocate resources having a periodic, semi-persistent pattern. Two types of configured SL grants are available, i.e., types 1 and 2. In type 2, the network can activate/deactivate the RRC-configured grant using DCI signaling. In other cases, the network may select the resources used for transmission but may give the transmitting SL UE some freedom to select some of the transmission parameters, possibly with some restrictions.

In both dynamic and configured SL grant, a SL receiver UE cannot receive the DCI that is addressed to the transmitter UE. Thus, the receiver UE must perform blind decoding to identify the presence of PSCCH and find the resources for the PSSCH through the SCI.

As mentioned above, NR SL U2N relay uses two different architectures: a L3 architecture similar to LTE, and a newly defined architecture in which PC5 relaying occurs within Layer 2 (L2), over the RLC sublayer. The L3-based U2N relay functionality is also referred to as ProSe 5G U2N Relay, and can be used for both public safety and commercial services. A UE connected to a L2 U2N relay is expected to be seen by the network as a regular UE, as if it was directly connected to the network. This gives the network control of the connection and services, but requires the definition of several new mechanisms not present or needed in the L3 architecture.

FIG. 7 illustrates an exemplary user plane (UP) SL protocol stack for a protocol data unit (PDU) Session, including a L2 UE-to-Network Relay UE. Below the application (APP) layer, the PDU layer carries data between the remote UE and the user plane function (UPF) in the 5GC, as part of the PDU session. In contrast, the PDCP layer is terminated at the remote UE and the gNB, and the L2 relay function is below PDCP. One consequence is that user data security is ensured between the remote UE and the gNB without exposing user data at the relay UE.

The Adaptation Relay layer within the relay UE can differentiate between signaling radio bearers (SRBs) and data radio bearers (DRBs) for a particular remote UE. The Adaptation Relay layer is also responsible for mapping PC5 traffic to one or more DRBs of the Uu. 3GPP RAN WG2 is responsible for the definition of the Adaptation Relay layer.

Figures 8, 9:
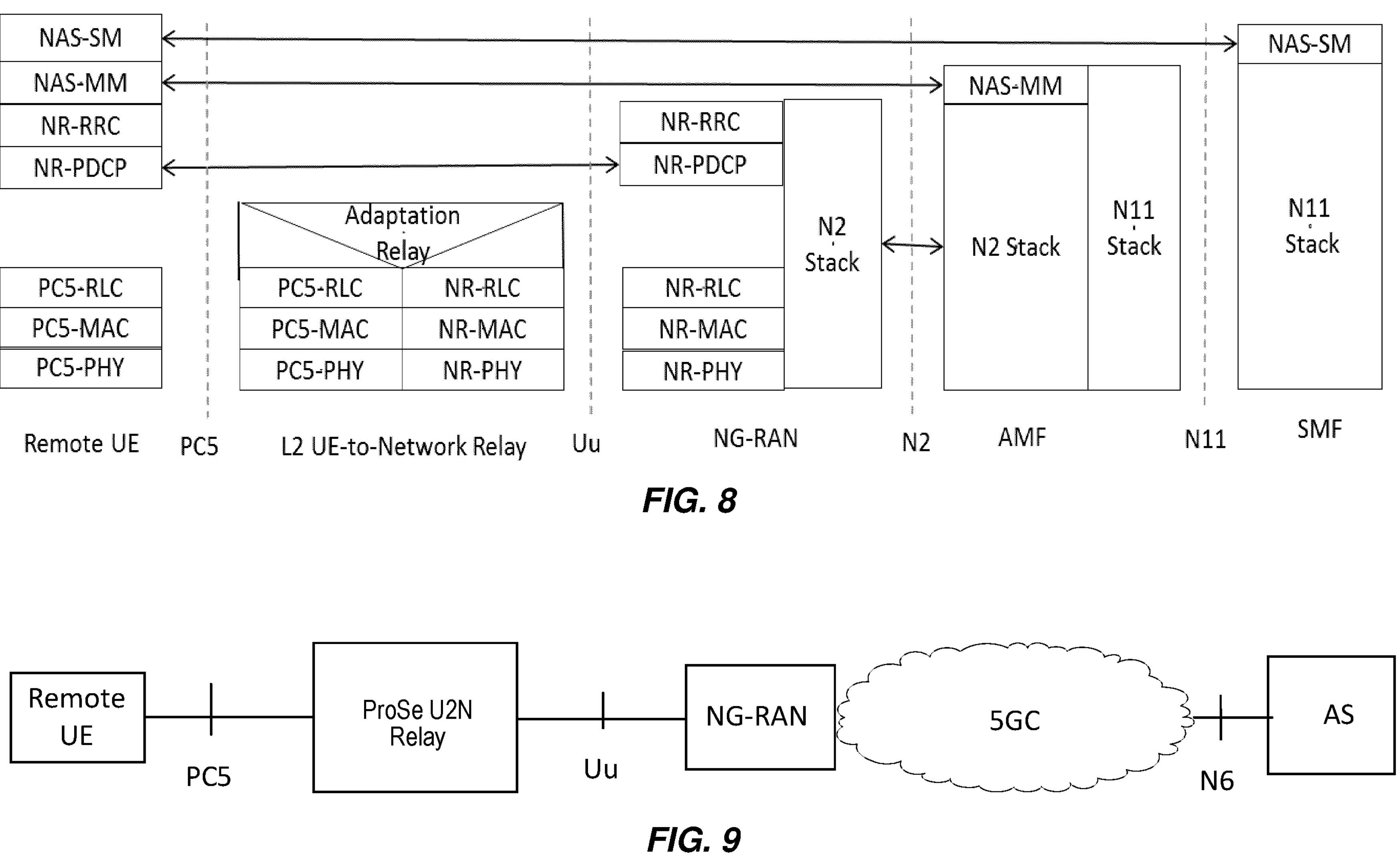
FIGS. 9-10 show exemplary architecture model and protocol stack, respectively, for L3 ProSe 5G U2N Relay.

FIG. 8 illustrates an exemplary control plane (CP) SL protocol stack for non-access stratum (NAS) messages, including a L2 UE-to-Network Relay UE. The NAS connection is between the remote UE and the AMF (for NAS-MM) and a session management function (SMF, for NAS-SM) in the 5GC. The NAS messages are transparently transferred between the remote UE and 5G-AN via the relay UE. In particular, the relay UE forwards SRB messages without any modification. Moreover, the relay UE uses the same protocol stack for forwarding both CP messages and UP PDUs, as illustrated in FIGS. 7-8.

Figure 10:
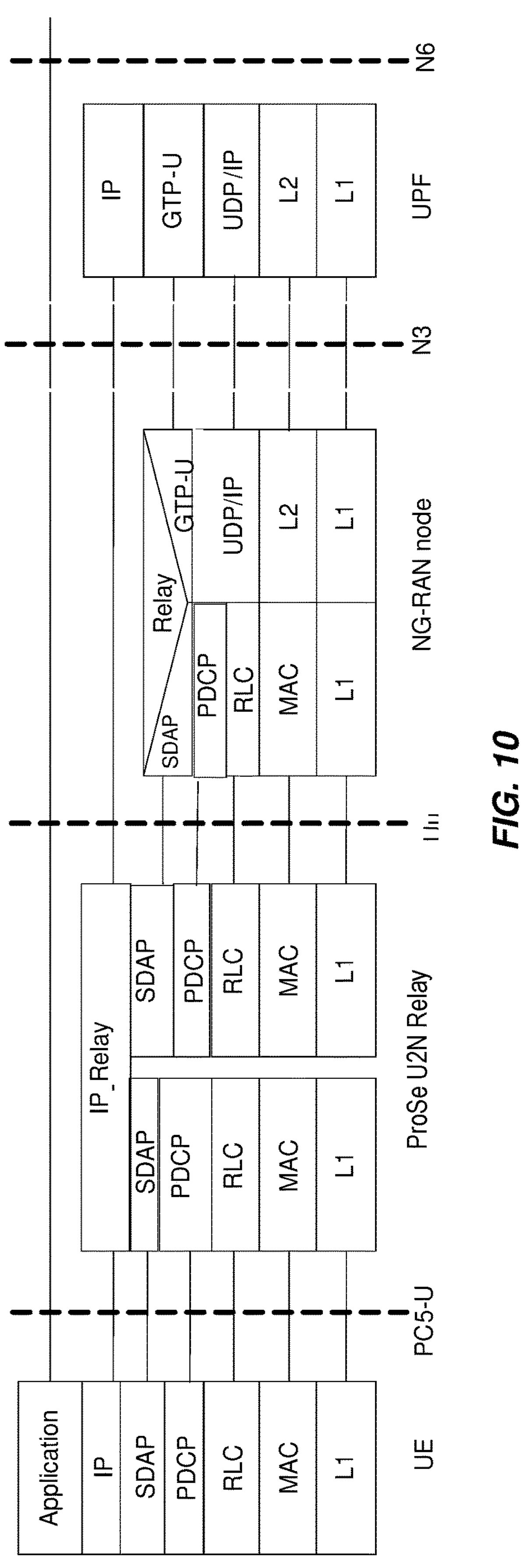

FIGS. 9-10 show an exemplary architecture model and an exemplary protocol stack, respectively, for L3 ProSe 5G U2N Relay, as further described in 3GPP TR 23.752 (v2.0.0). The ProSe 5G U2N Relay shall relay UL and DL unicast traffic between the Remote UE and the network (e.g., NG-RAN). One-to-one Direct Communication is used between Remote UEs and ProSe 5G U2N Relays for unicast traffic as specified in solutions for Key Issue #2 in 3GPP TR 23.752 (v2.0.0). The ProSe U2N Relay provides generic function that can relay any IP traffic. Hop-by-hop security is supported in the PC5 link and Uu link. If there are requirements beyond hop-by-hop security for protection of Remote UE's traffic, IP layer security should be applied.

Before a remote UE can communicate via a relay UE, the two UEs must discover each other. In NR SL, a ProSe direct discovery procedure can be used for a UE to discover or be discovered by other UE(s) in proximity over the PC5 interface (similar to LTE ProSe). Discovery can also take place on L2 in the case of L2 U2N relay UEs. Additionally, non-relay discovery (also referred to as "5G ProSe Direct Discovery") is under consideration by 3GPP.

However, it is unclear how an NR SL UE can determine whether a RAN node (e.g., gNB) serving the UE's coverage supports various features related to SL discovery. For example, the UE may be unable to distinguish between a situation where the RAN node supports L2 and/or L3 relay functionality but does not provide any L2/L3 relay configuration, and a situation where the RAN node does not support L2 and/or L3 relay functionality.

Accordingly, embodiments of the present disclosure address these and other problems, issues, and/or difficulties by providing techniques for signaling network support for various SL-related functionality to UEs, e.g., via unicast or broadcast. By receiving such information about the RAN node's capabilities, a UE can determine whether to initiate a SL discovery procedure.

For example, the information provided by the RAN node can indicate any of the following capabilities:

- Support for non-relay discovery;
- Support for non-relay discovery, but does not provide configuration for non-relay discovery;
- Support for relay operation (including relay discovery);
- Support for relay operation, but does not provide configuration for relay operation; and
- No discovery support.

Embodiments also address problems that did not exist in earlier LTE SL deployments. For example, LTE SL includes L3 relay but does not include L2 relay, so there was no need for a RAN node to provide an indication of whether it supports SL relay. As another example, there was no need for a RAN node to provide an indication of whether a discovery configuration should be applied to relay SL, non-relay SL, both, or neither.

Embodiments are described below in the context of NR, i.e., a remote UE and a relay UE are deployed in a same or different NR cell. Nevertheless, underlying principles of the described embodiments are also applicable to other relay scenarios including U2N or U2U relay where the link between remote UE and relay UE may be based on LTE SL or NR SL, and the connection between relay UE and RAN node may be LTE Uu or NR Uu.

Underlying principles of the described embodiments also apply to a relay scenario containing multiple relay hops. The connection between remote UE and relay UE is also not limited to PC5/SL; any short-range communication technology such as Wi-Fi can also be used.

Underlying principles of the described embodiments also apply to a relay scenario where a relay UE is configured with multiple connections (i.e., two or more) to the RAN, such as dual/multi connectivity, carrier aggregation, etc.

Underlying principles of the described embodiments also apply to both SL relay and non-relay scenarios. As mentioned above, "relay" used generally (e.g., relay discovery) refers to both L3 relay and L2 relay techniques, such as described herein. Non-relay discovery can refer to 5G ProSe Direct Discovery.

The term "discovery configuration" is used herein and can include any of the following information and/or parameters:

- Supported discovery models, e.g., Model A and/or Model B;
- Discovery periodicity, e.g., how often the UE can send a discovery message using the selected model
- One or multiple PC5 radio channel quality thresholds for triggering discovery procedure, e.g., if the measured PC5 quality is below a threshold, the UE may trigger a discovery procedure;
- One or multiple PC5 radio channel quality thresholds, e.g., a UE only discovers another UE if the measured PC5 radio channel quality is above a threshold;
- Discovery resource pools; and
- Frequency bands or carriers on which discovery is supported.

In some embodiments, a UE can determine whether the RAN node is capable of SL discovery via one of the following:

- presence or absence of a discovery configuration in a message, such as a SI block (SIB) or a dedicated RRC message; or
- an indicator of whether the RAN node is capable of SL discovery, included in the message.

After the determination, the UE can decide whether to access the RAN node to obtain a discovery configuration needed to initiate a discovery procedure.

In some embodiments, the RAN node may send as message (e.g., SIB or dedicated RRC) including a discovery configuration that applies to both relay discovery and non-relay discovery. Any UE interested in relay discovery or non-relay discovery can use the discovery configuration to initiate a discovery procedure.

In some embodiments, the RAN node can signal different discovery configurations in the message, i.e., for relay discovery and for non-relay discovery. Any UE interested in relay discovery can use the provided relay discovery configuration to initiate a discovery procedure, while any UE interested in non-relay discovery can use the provided non-relay discovery configuration to initiate a discovery procedure.

In some embodiments, the RAN node can indicate whether it is capable of relay operation via presence or absence in the SIB of a discovery configuration for SL relay. Alternatively or additionally, such an indication can be provided via dedicated signaling (e.g., RRC). In case the RAN node is capable of SL relay but doesn't want to provide a discovery configuration for SL relay, the RAN node can signal an empty discovery configuration IE for SL relay in the SIB.

In some embodiments, the RAN node can indicate whether it is capable of non-relay discovery (e.g., 5G ProSe Direct Discovery) via presence or absence in the SIB of a discovery configuration for non-relay discovery. Alternatively or additionally, the indication can be provided via dedicated signaling (e.g., RRC). In case the RAN node is capable of non-relay discovery but doesn't want to provide a discovery configuration for non-relay discovery, the RAN node can signal an empty discovery configuration IE for non-relay discovery in the SIB.

In some embodiments, the RAN node can send a message (e.g., in SIB or dedicated RRC message) with separate and/or independent indications of whether it is capable of relay operation and whether it is capable of non-relay discovery. For example, if the message includes an indicator that the RAN node is capable of relay operation but does not include a discovery configuration IE, then the UE determines that the RAN node is capable of relay operation, but the RAN node does not provide discovery configurations to UEs. As a more specific example, such relay operation may be on layer 2 (L2) and/or include relay discovery. As another more specific example, separate and/or independent indications may be in separate fields or IEs.

As another example, if the message includes an indicator that the RAN node supports non-relay discovery but does not include a discovery configuration IE, then the UE determines that the RAN node supports non-relay discovery but does not provide discovery configurations to UEs.

As another example, if the message does not include a discovery configuration, does not include an indicator that the RAN node supports relay operation, and does not include an indicator that the RAN node supports non-relay discovery, then the UE determines that the RAN node doesn't support discovery.

As another example, the RAN node can provide separate and/or independent indications of whether it is capable of relay discovery and whether it is capable of non-relay discovery.

In some embodiments, for a RAN node capable of SL relay operation, the indicator indicating a supported relay type (i.e., L2, L3, or both) can be included in the message independent of the discovery configuration IE.

FIG. 11 shows an ASN.1 data structure for SIB1 that includes configuration information for SL discovery and/or communications, according to some embodiments of the present disclosure. In particular, the data structure includes a SIB1-v17xy-IEs information element (IE) that includes fields sl-RelaySupport and sl-DiscoverySupport, both of which are optional.

The sl-RelaySupport field indicates whether the cell supports SL relay functionalities. The value L2 indicate the support of the L2 SL relay functionalities, the value L3 indicates support of L3 SL relay functionalities, and the value both indicates support for both L2 and L3 SL relay functionalities. If absent, SL relay functionalities are not supported by the network in the cell.

The sl-DiscoverySupport field indicates whether the cell supports SL discovery functionalities. The value relay indicate the support of the SL discovery functionalities for SL relay purposes, the value non-relay indicates support of SL discovery functionalities for SL purposes (but not SL relay), and the value both indicates support for both relay and non-relay SL discovery functionalities. If absent, SL discovery functionalities are not supported by the network in the cell.

FIGS. 12-13 show exemplary ASN.1 data structures according to other embodiments of the present disclosure. In particular, FIG. 12 shows another ASN.1 data structure for SIB1 and FIG. 13 shows an ASN.1 data structure for SIB 12, that together provide configuration information for SL discovery and/or communications. In particular, the data structure in FIG. 12 includes a SIB1-v17xy-IEs information element (IE) that includes the sl-RelaySupport field having the same contents as discussed above in relation to FIG. 12.

The data structure in FIG. 13 includes a sl-DiscConfigInfo-r17 IE that includes an sl-DiscConfigCommon-r17 field and an sl-DiscoverySupport-r17 field, both of which are optional. The sl-DiscConfigCommon-r17 field indicates a SL discovery configuration for both the L2 U2N Remote UEs and L2 U2N Remote UEs. If this field is absent, it indicates that SL discovery functionalities are not supported by the network in this cell.

The sl-DiscoverySupport-r17 field indicates whether the cell supports SL discovery functionalities for relay, non-relay SL communications, or both. The value relay indicates the support of the SL discovery functionalities for SL relay purposes, the value non-relay indicates support of SL discovery functionalities for SL purposes (but not SL relay), and the value both indicates support for both relay and non-relay SL discovery functionalities. If this field is absent, the UE shall not perform SL discovery functionalities in the cell.

FIG. 14 shows an ASN.1 data structure for an RRCReconfiguration message that includes configuration information for SL discovery and/or communications, according to some embodiments of the present disclosure. This message is sent by a RAN node via unicast to a particular UE, with instructions to modify the UE's RRC connection with the network. Portions of the message that are not relevant to the disclosed embodiments are omitted from the data structure shown in FIG. 14 for brevity.

The data structure shown in FIG. 14 includes an sl-DiscConfigInfo-r17 IE that includes an sl-DiscConfig-r17 field and an sl-DiscoverySupport-r17 field, both of which are optional. The sl-DiscConfig-r17 field indicates a SL discovery configuration for both the L2 U2N Remote UEs and L2 U2N Remote UEs. If this field is absent, it indicates that SL discovery functionalities are not supported by the network in this cell.

The sl-DiscoverySupport-r17 field Indicates whether the cell supports SL discovery functionalities for relay, non-relay SL communications, or both. The value relay indicates the support of the SL discovery functionalities for SL relay purposes, the value non-relay indicates support of SL discovery functionalities for SL purposes (but not SL relay), and the value both indicates support for both relay and non-relay SL discovery functionalities. If this field is absent, the UE shall not perform SL discovery functionalities in the cell.

Various features of the embodiments described above correspond to various operations illustrated in FIGS. 15-16, which show exemplary methods (e.g., procedures) for a UE and a RAN node, respectively. In other words, various features of the operations described below correspond to various embodiments described above. Furthermore, the exemplary methods shown in FIGS. 15-16 can be used cooperatively to provide various benefits, advantages, and/or solutions to problems described herein. Although FIGS. 15-16 show specific blocks in particular orders, the operations of the exemplary methods can be performed in different orders than shown and can be combined and/or divided into blocks having different functionality than shown. Optional blocks or operations are indicated by dashed lines.

In particular, FIG. 15 shows an exemplary method (e.g., procedure) for a first UE configured for SL operation in a cell of a RAN, according to various embodiments of the present disclosure. The exemplary method can be performed by a UE (e.g., wireless device, etc.) such as described elsewhere herein.

The exemplary method can include the operations of block 1510, where the first UE can receive, from a RAN node via the cell, one or more messages including a configuration for SL discovery and/or communications. The configuration includes at least one of the following:

- a first indication of whether the RAN node supports SL relay functionality,
- a second indication of whether the RAN node supports SL discovery functionality, and
- one or more SL discovery configurations for UEs; and The exemplary method can also include the operations of block 1520, where based on the received configuration, the first UE can selectively initiate a SL discovery procedure to discover at least a second UE that supports SL communications.

In some embodiments, absence of the first indication indicates that the RAN node does not support SL relay functionality. In some of these embodiments, when present, the first indication can have a first value indicating that the RAN node supports layer-2 (L2) SL relay. In some further variants, when present, the first indication can also have any of the following values (e.g., as an alternative to the first value):

- a second value indicating that the RAN node supports layer-3 (L3) SL relay, and a third value indicating that the RAN node supports both L2 and L3 SL relay.

FIGS. 11-12 and 14 show examples of a first indication according to these embodiments and/or variants.

In some embodiments, absence of the second indication indicates that the RAN node does not support SL discovery functionality. In some of these embodiments, the second indication includes separate (e.g., independent) first and second fields. When present, the first field indicates that that the RAN node supports relay discovery. When present, the second field indicates that the RAN node supports non-relay discovery.

In other of these embodiments, when present, the second indication can have one of the following values:

- a first value indicating that the RAN node supports relay discovery,
- a second value indicating that the RAN node supports non-relay discovery, and
- a third value indicating that the RAN node supports both relay and non-relay discovery.

FIG. 11 shows an example second indication according to these embodiments.

In some of these embodiments, the following conditions indicate that the RAN node supports non-relay discovery but does provide SL discovery configurations to UEs: the second indication being present and having contents indicating that the RAN node supports non-relay discovery; and absence of SL discovery configurations from the one or more messages.

In some embodiments, when present, the one or more SL discovery configurations include a first discovery configuration for relay UEs and a second discovery configuration for non-relay UEs. FIGS. 13-14 show examples of first and second discovery configurations according to these embodiments. In such embodiments, selectively initiating the discovery procedure in block 1520 can include the operations of sub-block 1521, where the first UE can select one of the first and second discovery configurations for the discovery procedure based on whether it (i.e., the first UE) is a relay UE or a non-relay UE.

In some of these embodiments, each of the first and second SL discovery configurations include one or more of the following:

- indication of one or more supported discovery models;
- how often the UE can send a discovery message based on the supported discovery models;
- one or more radio channel quality thresholds for triggering discovery procedures;
- one or more radio channel quality thresholds for discovering another UE during a discovery procedure;
- discovery resource pools; and
- frequency bands or carriers on which discovery is supported.

In some embodiments, the one or more messages are received from the RAN node as one or more system information blocks (SIBs) broadcast in the cell. In other embodiments, the one or more messages are received from the RAN node as a single unicast RRC message.

In addition, FIG. 16 shows an exemplary method (e.g., procedure) for a RAN node to configure UEs for SL operation, according to various embodiments of the present disclosure. The exemplary method can be performed by a RAN node (e.g., base station, eNB, gNB, en-gNB, etc.) such as described elsewhere herein.

The exemplary method can include the operations of block 1610, where the RAN node can send, to one or more UEs via a cell, one or more messages including a configuration for SL discovery and/or communications. The configuration includes at least one of the following:

- a first indication of whether the RAN node supports SL relay functionality,
- a second indication of whether the RAN node supports SL discovery functionality, and
- one or more SL discovery configurations for UEs.

In some embodiments, absence of the first indication indicates that the RAN node does not support SL relay functionality. In some of these embodiments, when present, the first indication can have a first value indicating that the RAN node supports layer-2 (L2) SL relay. In some further variants, when present, the first indication can also have any of the following values (e.g., as an alternative to the first value):

- a second value indicating that the RAN node supports layer-3 (L3) SL relay, and
- a third value indicating that the RAN node supports both L2 and L3 SL relay.

FIGS. 11-12 and 14 show examples of a first indication according to these embodiments and/or variants.

In some embodiments, absence of the second indication indicates that the RAN node does not support SL discovery functionality. In some of these embodiments, the second indication includes separate (e.g., independent) first and second fields. When present, the first field indicates that that the RAN node supports relay discovery. When present, the second field indicates that the RAN node supports non-relay discovery.

In other of these embodiments, when present, the second indication can have one of the following values:

- a first value indicating that the RAN node supports relay discovery,
- a second value indicating that the RAN node supports non-relay discovery, and
- a third value indicating that the RAN node supports both relay and non-relay discovery.

FIG. 11 shows an example second indication according to these embodiments.

In some of these embodiments, the following conditions indicate that the RAN node supports non-relay discovery but does provide SL discovery configurations to UEs: the second indication being present and having contents indicating that the RAN node supports non-relay discovery; and absence of SL discovery configurations from the one or more messages.

In some embodiments, when present, the one or more SL discovery configurations include a first discovery configuration for relay UEs and a second discovery configuration for non-relay UEs. FIGS. 13-14 show examples of first and second discovery configurations according to these embodiments. In some of these embodiments, each of the first and second SL discovery configurations include one or more of the following:

- indication of one or more supported discovery models;
- how often the UE can send a discovery message based on the supported discovery models;
- one or more radio channel quality thresholds for triggering discovery procedures;
- one or more radio channel quality thresholds for discovering another UE during a discovery procedure;
- discovery resource pools; and
- frequency bands or carriers on which discovery is supported.

In some embodiments, the one or more messages are sent as one or more SIBs broadcast in the cell. In other embodiments, the one or more messages are sent as respective one or more unicast RRC messages to the one or more UEs.

Although various embodiments are described above in terms of methods, techniques, and/or procedures, the person of ordinary skill will readily comprehend that such methods, techniques, and/or procedures can be embodied by various combinations of hardware and software in various systems, communication devices, computing devices, control devices, apparatuses, non-transitory computer-readable media, computer program products, etc.

Figure 17:
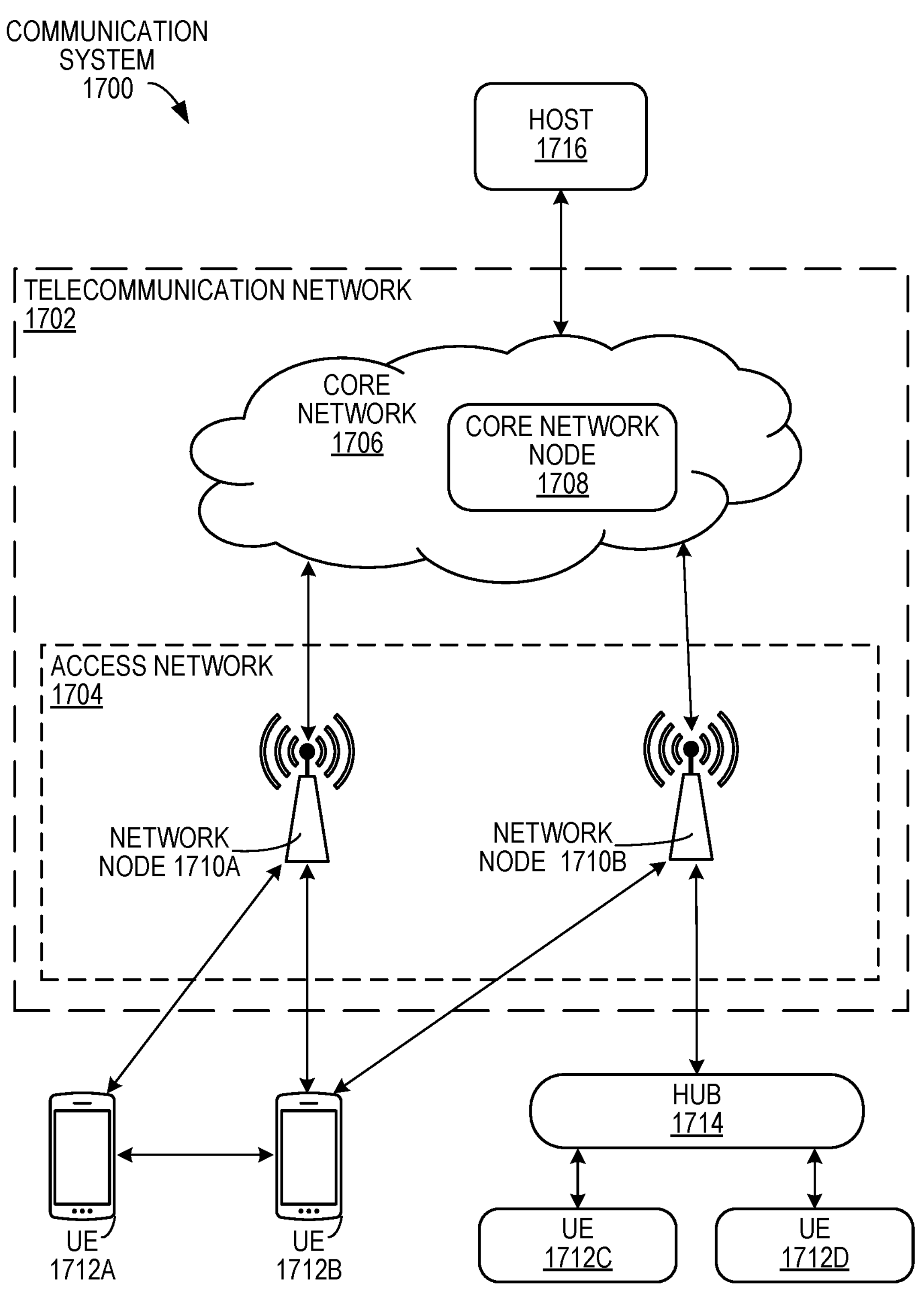
FIG. 17 shows a communication system according to various embodiments of the present disclosure.

FIG. 17 shows an example of a communication system 1700 in accordance with some embodiments. In this example, the communication system 1700 includes a telecommunication network 1702 that includes an access network 1704, such as a radio access network (RAN), and a core network 1706, which includes one or more core network nodes 1708. The access network 1704 includes one or more access network nodes, such as network nodes 1710*a* and 1710*b* (one or more of which may be generally referred to as network nodes 1710), or any other similar 3GPP access node or non-3GPP access point. The network nodes 1710 facilitate direct or indirect connection of UEs, such as by connecting UEs 1712*a*, 1712*b*, 1712*c*, and 1712*d* (one or more of which may be generally referred to as UEs 1712) to the core network 1706 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 1700 may include any number of wired or wireless networks, network nodes, UEs, and/or any other components or systems that may facilitate or participate in the communication of data and/or signals whether via wired or wireless connections. The communication system 1700 may include and/or interface with any type of communication, telecommunication, data, cellular, radio network, and/or other similar type of system.

The UEs 1712 may be any of a wide variety of communication devices, including wireless devices arranged, configured, and/or operable to communicate wirelessly with the network nodes 1710 and other communication devices. Similarly, the network nodes 1710 are arranged, capable, configured, and/or operable to communicate directly or indirectly with the UEs 1712 and/or with other network nodes or equipment in the telecommunication network 1702 to enable and/or provide network access, such as wireless network access, and/or to perform other functions, such as administration in the telecommunication network 1702.

In the depicted example, the core network 1706 connects the network nodes 1710 to one or more hosts, such as host 1716. These connections may be direct or indirect via one or more intermediary networks or devices. In other examples, network nodes may be directly coupled to hosts. The core network 1706 includes one more core network nodes (e.g., core network node 1708) that are structured with hardware and software components. Features of these components may be substantially similar to those described with respect to the UEs, network nodes, and/or hosts, such that the descriptions thereof are generally applicable to the corresponding components of the core network node 1708. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 1716 may be under the ownership or control of a service provider other than an operator or provider of the access network 1704 and/or the telecommunication network 1702, and may be operated by the service provider or on behalf of the service provider. The host 1716 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 1700 of FIG. 17 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 1702 is a cellular network that implements 3GPP standardized features. Accordingly, the telecommunications network 1702 may support network slicing to provide different logical networks to different devices that are connected to the telecommunication network 1702. For example, the telecommunications network 1702 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 1712 are configured to transmit and/or receive information without direct human interaction. For instance, a UE may be designed to transmit information to the access network 1704 on a predetermined schedule, when triggered by an internal or external event, or in response to requests from the access network 1704. Additionally, a UE may be configured for operating in single- or multi-RAT or multi-standard mode. For example, a UE may operate with any one or combination of Wi-Fi, NR (New Radio) and LTE, i.e., being configured for multi-radio dual connectivity (MR-DC), such as E-UTRAN (Evolved-UMTS Terrestrial Radio Access Network) New Radio-Dual Connectivity (EN-DC).

In the example, the hub 1714 communicates with the access network 1704 to facilitate indirect communication between one or more UEs (e.g., UE 1712*c* and/or 1712*d*) and network nodes (e.g., network node 1710*b*). In some examples, the hub 1714 may be a controller, router, content source and analytics, or any of the other communication devices described herein regarding UEs. For example, the hub 1714 may be a broadband router enabling access to the core network 1706 for the UEs. As another example, the hub

1714 may be a controller that sends commands or instructions to one or more actuators in the UEs. Commands or instructions may be received from the UEs, network nodes 1710, or by executable code, script, process, or other instructions in the hub 1714. As another example, the hub 1714 may be a data collector that acts as temporary storage for UE data and, in some embodiments, may perform analysis or other processing of the data. As another example, the hub 1714 may be a content source. For example, for a UE that is a VR headset, display, loudspeaker or other media delivery device, the hub 1714 may retrieve VR assets, video, audio, or other media or data related to sensory information via a network node, which the hub 1714 then provides to the UE either directly, after performing local processing, and/or after adding additional local content. In still another example, the hub 1714 acts as a proxy server or orchestrator for the UEs, in particular in if one or more of the UEs are low energy IoT devices.

The hub 1714 may have a constant/persistent or intermittent connection to the network node 1710*b*. The hub 1714 may also allow for a different communication scheme and/or schedule between the hub 1714 and UEs (e.g., UE 1712*c* and/or 1712*d*), and between the hub 1714 and the core network 1706. In other examples, the hub 1714 is connected to the core network 1706 and/or one or more UEs via a wired connection. Moreover, the hub 1714 may be configured to connect to an M2M service provider over the access network 1704 and/or to another UE over a direct connection. In some scenarios, UEs may establish a wireless connection with the network nodes 1710 while still connected via the hub 1714 via a wired or wireless connection. In some embodiments, the hub 1714 may be a dedicated hub—that is, a hub whose primary function is to route communications to/from the UEs from/to the network node 1710*b*. In other embodiments, the hub 1714 may be a non-dedicated hub—that is, a device which is capable of operating to route communications between the UEs and network node 1710*b*, but which is additionally capable of operating as a communication start and/or end point for certain data channels.

Figure 18:
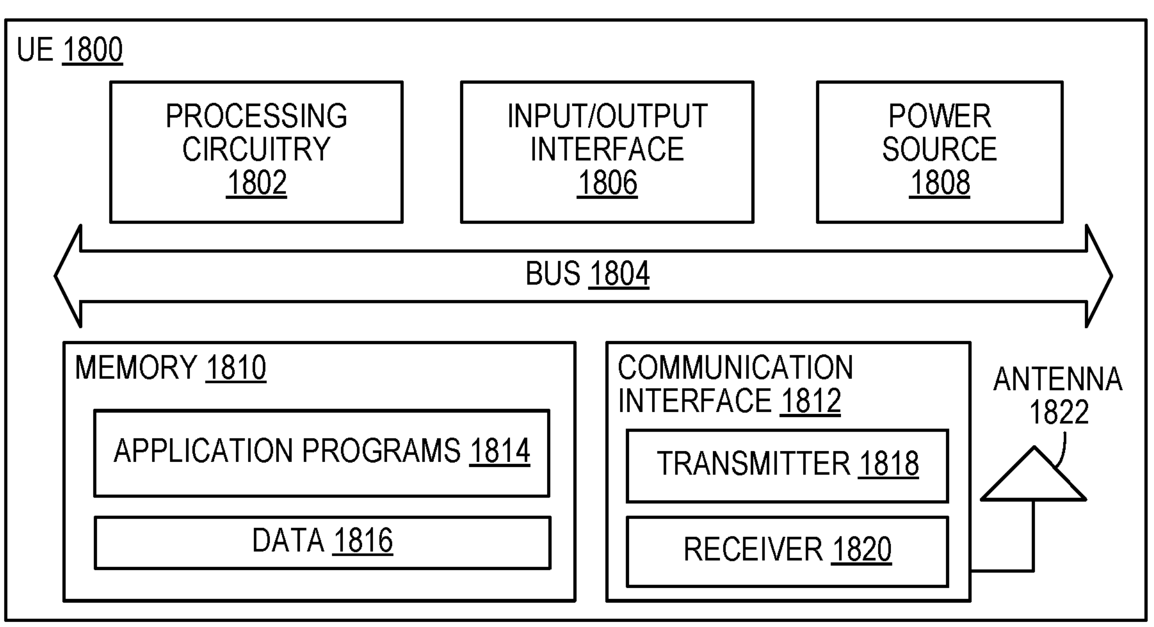
FIG. 18 shows a UE according to various embodiments of the present disclosure.

FIG. 18 shows a UE 1800 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VoIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 1800 includes processing circuitry 1802 that is operatively coupled via a bus 1804 to an input/output interface 1806, a power source 1808, a memory 1810, a communication interface 1812, and/or any other component, or any combination thereof. Certain UEs may utilize all or a subset of the components shown in FIG. 18. The level of integration between the components may vary from one UE to another UE. Further, certain UEs may contain multiple instances of a component, such as multiple processors, memories, transceivers, transmitters, receivers, etc.

The processing circuitry 1802 is configured to process instructions and data and may be configured to implement any sequential state machine operative to execute instructions stored as machine-readable computer programs in the memory 1810. The processing circuitry 1802 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 1802 may include multiple central processing units (CPUs).

In the example, the input/output interface 1806 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 1800. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 1808 is structured as a battery or battery pack. Other types of power sources, such as an external power source (e.g., an electricity outlet), photovoltaic device, or power cell, may be used. The power source 1808 may further include power circuitry for delivering power from the power source 1808 itself, and/or an external power source, to the various parts of the UE 1800 via input circuitry or an interface such as an electrical power cable. Delivering power may be, for example, for charging of the power source 1808. Power circuitry may perform any formatting, converting, or other modification to the power from the power source 1808 to make the power suitable for the respective components of the UE 1800 to which power is supplied.

The memory 1810 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 1810 includes one or more application programs 1814, such as an operating system, web browser application, a widget, gadget engine, or other application, and corresponding data 1816. The memory 1810 may store, for use by the UE 1800, any of a variety of various operating systems or combinations of operating systems.

The memory 1810 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 1810 may allow the UE 1800 to access instructions, application programs and the like, stored on transitory or non-transitory memory media, to off-load data, or to upload data. An article of manufacture, such as one utilizing a communication system may be tangibly embodied as or in the memory 1810, which may be or comprise a device-readable storage medium.

The processing circuitry 1802 may be configured to communicate with an access network or other network using the communication interface 1812. The communication interface 1812 may comprise one or more communication subsystems and may include or be communicatively coupled to an antenna 1822. The communication interface 1812 may include one or more transceivers used to communicate, such as by communicating with one or more remote transceivers of another device capable of wireless communication (e.g., another UE or a network node in an access network). Each transceiver may include a transmitter 1818 and/or a receiver 1820 appropriate to provide network communications (e.g., optical, electrical, frequency allocations, and so forth). Moreover, the transmitter 1818 and receiver 1820 may be coupled to one or more antennas (e.g., antenna 1822) and may share circuit components, software or firmware, or alternatively be implemented separately.

In the illustrated embodiment, communication functions of the communication interface 1812 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 1812, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., an alert is sent when moisture is detected), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 1800 shown in FIG. 18.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g., by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 19:
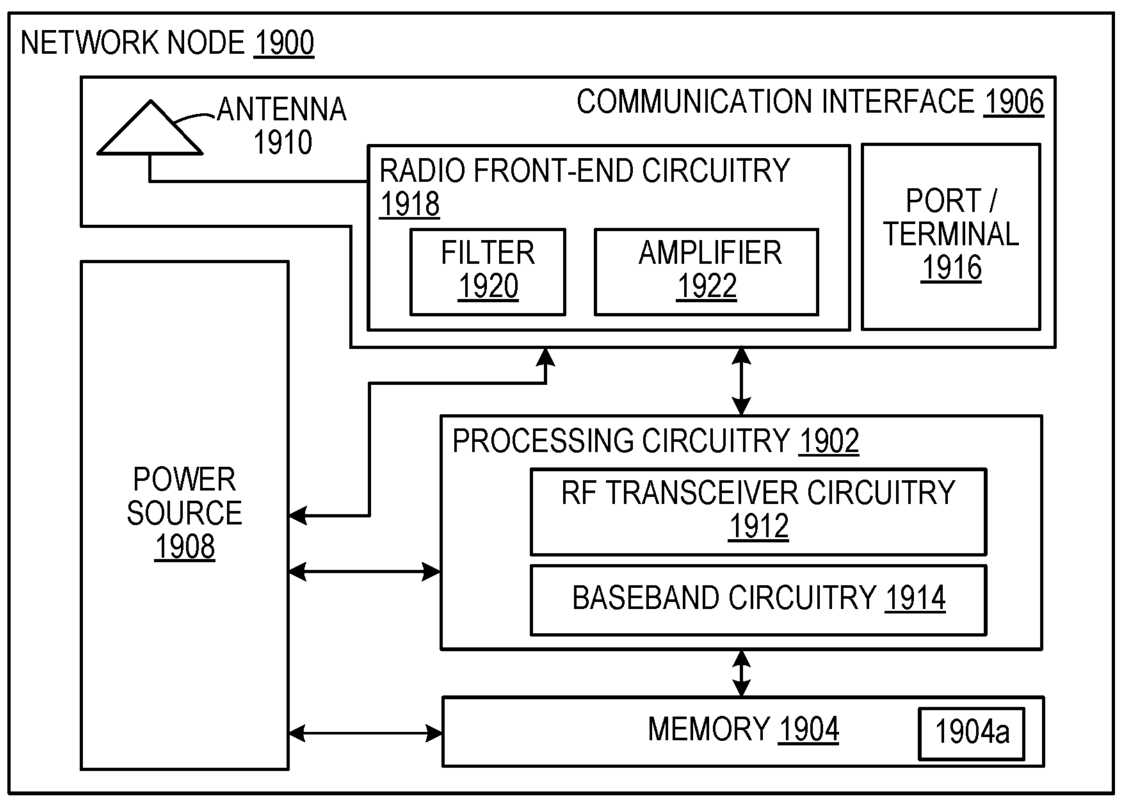
FIG. 19 shows a network node according to various embodiments of the present disclosure.

FIG. 19 shows a network node 1900 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 1900 includes a processing circuitry 1902, a memory 1904, a communication interface 1906, and a power source 1908. The network node 1900 may be composed of multiple physically separate components (e.g., a NodeB component and a RNC component, or a BTS component and a BSC component, etc.), which may each have their own respective components. In certain scenarios in which the network node 1900 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 1900 may be configured to support multiple radio access technologies (RATs). In such embodiments, some components may be duplicated (e.g., separate memory 1904 for different RATs) and some components may be reused (e.g., a same antenna 1910 may be shared by different RATs). The network node 1900 may also include multiple sets of the various illustrated components for different wireless technologies integrated into network node 1900, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 1900.

The processing circuitry 1902 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1900 components, such as the memory 1904, to provide network node 1900 functionality.

In some embodiments, the processing circuitry 1902 includes a system on a chip (SOC). In some embodiments, the processing circuitry 1902 includes one or more of radio frequency (RF) transceiver circuitry 1912 and baseband processing circuitry 1914. In some embodiments, the radio frequency (RF) transceiver circuitry 1912 and the baseband processing circuitry 1914 may be on separate chips (or sets of chips), boards, or units, such as radio units and digital units. In alternative embodiments, part or all of RF transceiver circuitry 1912 and baseband processing circuitry 1914 may be on the same chip or set of chips, boards, or units.

The memory 1904 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 1902. The memory 1904 may store any suitable instructions, data, or information, including a computer program, software, an application including one or more of logic, rules, code, tables, and/or other instructions (collectively denoted computer program product 1904*a*) capable of being executed by the processing circuitry 1902 and utilized by the network node 1900. The memory 1904 may be used to store any calculations made by the processing circuitry 1902 and/or any data received via the communication interface 1906. In some embodiments, the processing circuitry 1902 and memory 1904 is integrated.

The communication interface 1906 is used in wired or wireless communication of signaling and/or data between a network node, access network, and/or UE. As illustrated, the communication interface 1906 comprises port(s)/terminal(s) 1916 to send and receive data, for example to and from a network over a wired connection. The communication interface 1906 also includes radio front-end circuitry 1918 that may be coupled to, or in certain embodiments a part of, the antenna 1910. Radio front-end circuitry 1918 comprises filters 1920 and amplifiers 1922. The radio front-end circuitry 1918 may be connected to an antenna 1910 and processing circuitry 1902. The radio front-end circuitry may be configured to condition signals communicated between antenna 1910 and processing circuitry 1902. The radio front-end circuitry 1918 may receive digital data that is to be sent out to other network nodes or UEs via a wireless connection. The radio front-end circuitry 1918 may convert the digital data into a radio signal having the appropriate channel and bandwidth parameters using a combination of filters 1920 and/or amplifiers 1922. The radio signal may then be transmitted via the antenna 1910. Similarly, when receiving data, the antenna 1910 may collect radio signals which are then converted into digital data by the radio front-end circuitry 1918. The digital data may be passed to the processing circuitry 1902. In other embodiments, the communication interface may comprise different components and/or different combinations of components.

In certain alternative embodiments, the network node 1900 does not include separate radio front-end circuitry 1918, instead, the processing circuitry 1902 includes radio front-end circuitry and is connected to the antenna 1910. Similarly, in some embodiments, all or some of the RF transceiver circuitry 1912 is part of the communication interface 1906. In still other embodiments, the communication interface 1906 includes one or more ports or terminals 1916, the radio front-end circuitry 1918, and the RF transceiver circuitry 1912, as part of a radio unit (not shown), and the communication interface 1906 communicates with the baseband processing circuitry 1914, which is part of a digital unit (not shown).

The antenna 1910 may include one or more antennas, or antenna arrays, configured to send and/or receive wireless signals. The antenna 1910 may be coupled to the radio front-end circuitry 1918 and may be any type of antenna capable of transmitting and receiving data and/or signals wirelessly. In certain embodiments, the antenna 1910 is separate from the network node 1900 and connectable to the network node 1900 through an interface or port.

The antenna 1910, communication interface 1906, and/or the processing circuitry 1902 may be configured to perform any receiving operations and/or certain obtaining operations described herein as being performed by the network node. Any information, data and/or signals may be received from a UE, another network node and/or any other network equipment. Similarly, the antenna 1910, the communication interface 1906, and/or the processing circuitry 1902 may be configured to perform any transmitting operations described herein as being performed by the network node. Any information, data and/or signals may be transmitted to a UE, another network node and/or any other network equipment.

The power source 1908 provides power to the various components of network node 1900 in a form suitable for the respective components (e.g., at a voltage and current level needed for each respective component). The power source 1908 may further comprise, or be coupled to, power management circuitry to supply the components of the network node 1900 with power for performing the functionality described herein. For example, the network node 1900 may be connectable to an external power source (e.g., the power grid, an electricity outlet) via an input circuitry or interface such as an electrical cable, whereby the external power source supplies power to power circuitry of the power source 1908. As a further example, the power source 1908 may comprise a source of power in the form of a battery or battery pack which is connected to, or integrated in, power circuitry. The battery may provide backup power should the external power source fail.

Embodiments of the network node 1900 may include additional components beyond those shown in FIG. 19 for providing certain aspects of the network node's functionality, including any of the functionality described herein and/or any functionality necessary to support the subject matter described herein. For example, the network node 1900 may include user interface equipment to allow input of information into the network node 1900 and to allow output of information from the network node 1900. This may allow a user to perform diagnostic, maintenance, repair, and other administrative functions for the network node 1900.

Figure 20:
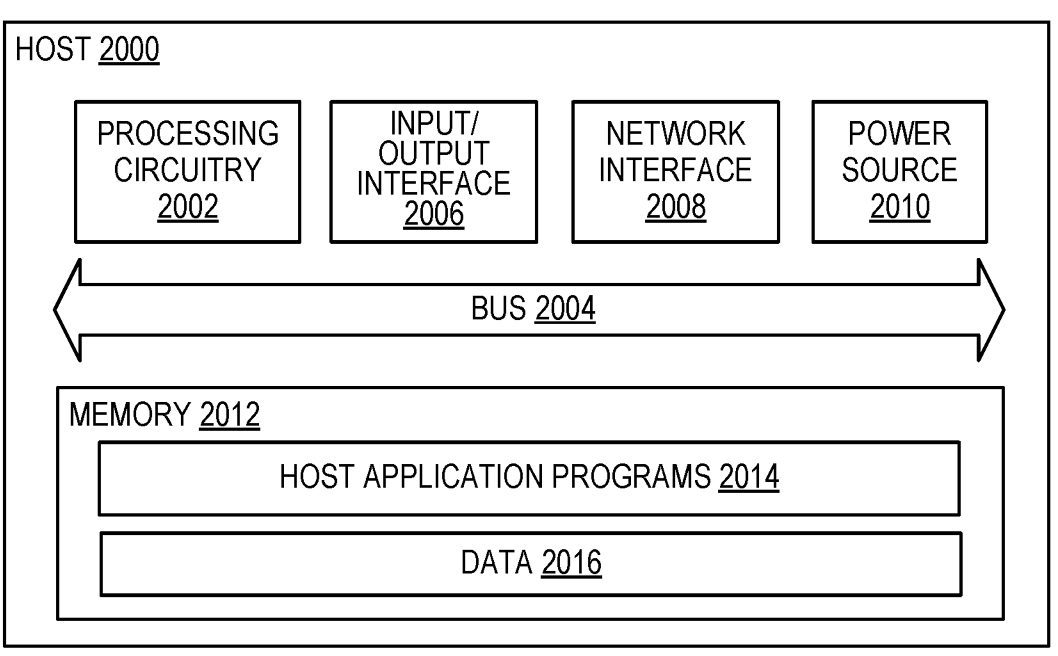
FIG. 20 shows host computing system according to various embodiments of the present disclosure.

FIG. 20 is a block diagram of a host 2000, which may be an embodiment of the host 1716 of FIG. 17, in accordance with various aspects described herein. As used herein, the host 2000 may be or comprise various combinations hardware and/or software, including a standalone server, a blade server, a cloud-implemented server, a distributed server, a virtual machine, container, or processing resources in a server farm. The host 2000 may provide one or more services to one or more UEs.

The host 2000 includes processing circuitry 2002 that is operatively coupled via a bus 2004 to an input/output interface 2006, a network interface 2008, a power source 2010, and a memory 2012. Other components may be included in other embodiments. Features of these components may be substantially similar to those described with respect to the devices of previous figures, such as FIGS. 18 and 19, such that the descriptions thereof are generally applicable to the corresponding components of host 2000.

The memory 2012 may include one or more computer programs including one or more host application programs 2014 and data 2016, which may include user data, e.g., data generated by a UE for the host 2000 or data generated by the host 2000 for a UE. Embodiments of the host 2000 may utilize only a subset or all of the components shown. The host application programs 2014 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 2014 may also provide for user authentication and licensing checks and may periodically report health, routes, and content availability to a central node, such as a device in or on the edge of a core network. Accordingly, the host 2000 may select and/or indicate a different host for over-the-top services for a UE. The host application programs 2014 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 21:
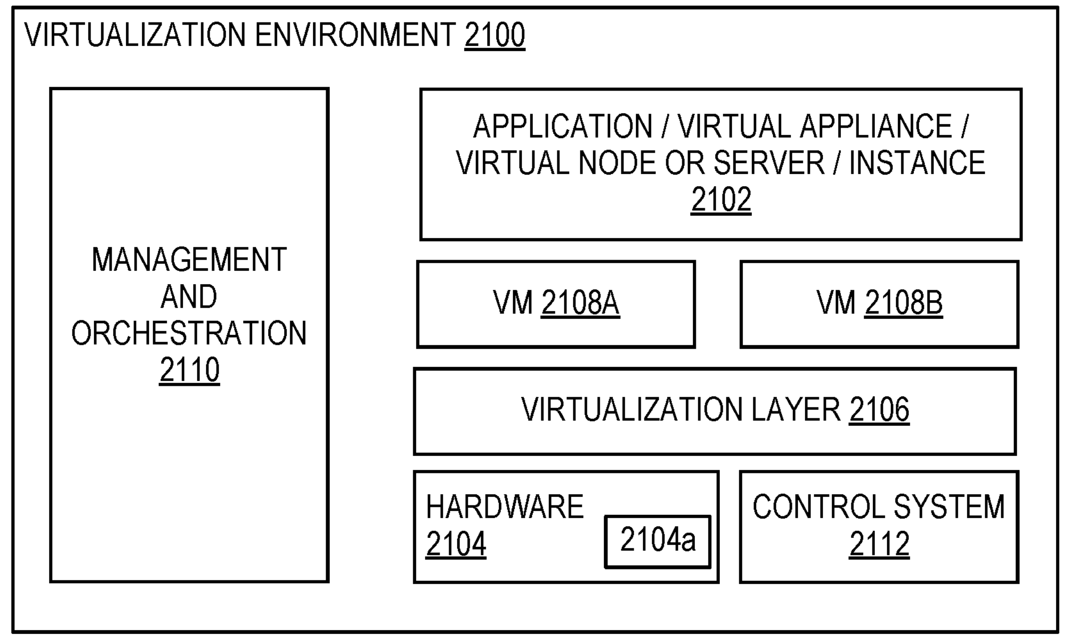
FIG. 21 is a block diagram of a virtualization environment in which functions implemented by some embodiments of the present disclosure may be virtualized.

FIG. 21 is a block diagram illustrating a virtualization environment 2100 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 2100 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 2102 (which may alternatively be called software instances, virtual appliances, network functions, virtual nodes, virtual network functions, etc.) are run in the virtualization environment 2100 to implement some of the features, functions, and/or benefits of some of the embodiments disclosed herein.

Hardware 2104 includes processing circuitry, memory that stores software and/or instructions (collectively denoted computer program product 2104*a*) executable by hardware processing circuitry, and/or other hardware devices as described herein, such as a network interface, input/output interface, and so forth. Software may be executed by the processing circuitry to instantiate one or more virtualization layers 2106 (also referred to as hypervisors or virtual machine monitors (VMMs)), provide VMs 2108*a* and 2108*b* (one or more of which may be generally referred to as VMs 2108), and/or perform any of the functions, features and/or benefits described in relation with some embodiments described herein. The virtualization layer 2106 may present a virtual operating platform that appears like networking hardware to the VMs 2108.

The VMs 2108 comprise virtual processing, virtual memory, virtual networking or interface and virtual storage, and may be run by a corresponding virtualization layer 2106. Different embodiments of the instance of a virtual appliance 2102 may be implemented on one or more of VMs 2108, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 2108 may be a software implementation of a physical machine that runs programs as if they were executing on a physical, non-virtualized machine. Each of the VMs 2108, and that part of hardware 2104 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 2108 on top of the hardware 2104 and corresponds to the application 2102.

Hardware 2104 may be implemented in a standalone network node with generic or specific components. Hardware 2104 may implement some functions via virtualization. Alternatively, hardware 2104 may be part of a larger cluster of hardware (e.g., such as in a data center or CPE) where many hardware nodes work together and are managed via management and orchestration 2110, which, among others, oversees lifecycle management of applications 2102. In some embodiments, hardware 2104 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 2112 which may alternatively be used for communication between hardware nodes and radio units.

Figure 22:
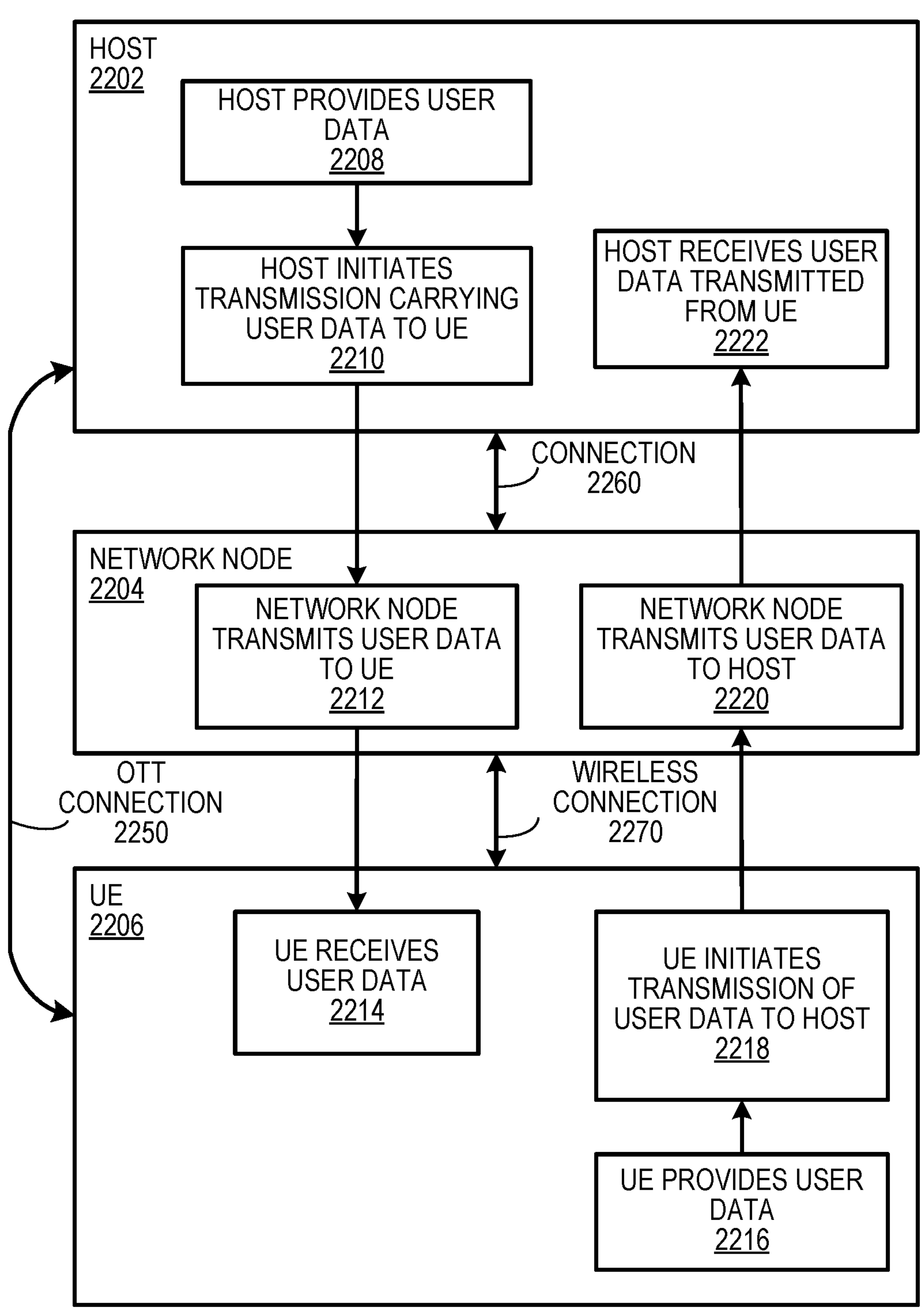
FIG. 22 illustrates communication between a host computing system, a network node, and a UE via multiple connections, at least one of which is wireless, according to various embodiments of the present disclosure.

FIG. 22 shows a communication diagram of a host 2202 communicating via a network node 2204 with a UE 2206 over a partially wireless connection in accordance with some embodiments. Example implementations, in accordance with various embodiments, of the UE (such as a UE 1712*a* of FIG. 17 and/or UE 1800 of FIG. 18), network node (such as network node 1710*a* of FIG. 17 and/or network node 1900 of FIG. 19), and host (such as host 1716 of FIG. 17 and/or host 2000 of FIG. 20) discussed in the preceding paragraphs will now be described with reference to FIG. 22.

Like host 2000, embodiments of host 2202 include hardware, such as a communication interface, processing circuitry, and memory. The host 2202 also includes software, which is stored in or accessible by the host 2202 and executable by the processing circuitry. The software includes a host application that may be operable to provide a service to a remote user, such as the UE 2206 connecting via an over-the-top (OTT) connection 2250 extending between the UE 2206 and host 2202. In providing the service to the remote user, a host application may provide user data which is transmitted using the OTT connection 2250.

The network node 2204 includes hardware enabling it to communicate with the host 2202 and UE 2206. The connection 2260 may be direct or pass through a core network (like core network 1706 of FIG. 17) and/or one or more other intermediate networks, such as one or more public, private, or hosted networks. For example, an intermediate network may be a backbone network or the Internet.

The UE 2206 includes hardware and software, which is stored in or accessible by UE 2206 and executable by the UE's processing circuitry. The software includes a client application, such as a web browser or operator-specific "app" that may be operable to provide a service to a human or non-human user via UE 2206 with the support of the host 2202. In the host 2202, an executing host application may communicate with the executing client application via the OTT connection 2250 terminating at the UE 2206 and host 2202. In providing the service to the user, the UE's client application may receive request data from the host's host application and provide user data in response to the request data. The OTT connection 2250 may transfer both the request data and the user data. The UE's client application may interact with the user to generate the user data that it provides to the host application through the OTT connection 2250.

The OTT connection 2250 may extend via a connection 2260 between the host 2202 and the network node 2204 and via a wireless connection 2270 between the network node 2204 and the UE 2206 to provide the connection between the host 2202 and the UE 2206. The connection 2260 and wireless connection 2270, over which the OTT connection 2250 may be provided, have been drawn abstractly to illustrate the communication between the host 2202 and the UE 2206 via the network node 2204, without explicit reference to any intermediary devices and the precise routing of messages via these devices.

As an example of transmitting data via the OTT connection 2250, in step 2208, the host 2202 provides user data, which may be performed by executing a host application. In some embodiments, the user data is associated with a particular human user interacting with the UE 2206. In other embodiments, the user data is associated with a UE 2206 that shares data with the host 2202 without explicit human interaction. In step 2210, the host 2202 initiates a transmission carrying the user data towards the UE 2206. The host 2202 may initiate the transmission responsive to a request transmitted by the UE 2206. The request may be caused by human interaction with the UE 2206 or by operation of the client application executing on the UE 2206. The transmission may pass via the network node 2204, in accordance with the teachings of the embodiments described throughout this disclosure. Accordingly, in step 2212, the network node 2204 transmits to the UE 2206 the user data that was carried in the transmission that the host 2202 initiated, in accordance with the teachings of the embodiments described throughout this disclosure. In step 2214, the UE 2206 receives the user data carried in the transmission, which may be performed by a client application executed on the UE 2206 associated with the host application executed by the host 2202.

In some examples, the UE 2206 executes a client application which provides user data to the host 2202. The user data may be provided in reaction or response to the data received from the host 2202. Accordingly, in step 2216, the UE 2206 may provide user data, which may be performed by executing the client application. In providing the user data, the client application may further consider user input received from the user via an input/output interface of the UE 2206. Regardless of the specific manner in which the user data was provided, the UE 2206 initiates, in step 2218, transmission of the user data towards the host 2202 via the network node 2204. In step 2220, in accordance with the teachings of the embodiments described throughout this disclosure, the network node 2204 receives user data from the UE 2206 and initiates transmission of the received user data towards the host 2202. In step 2222, the host 2202 receives the user data carried in the transmission initiated by the UE 2206.

One or more of the various embodiments improve the performance of OTT services provided to the UE 2206 using the OTT connection 2250, in which the wireless connection 2270 forms the last segment. More precisely, embodiments described herein provide techniques for a RAN node to signal network support for various SL discovery-related functionality to UEs in a cell, e.g., via unicast or broadcast. By receiving such information about the RAN node's capabilities, a UE is able to determine whether to initiate a SL discovery procedure and/or what configuration to apply when initiating the SL discovery procedure. In this manner, embodiments improve SL communications between UEs by facilitating easier discovery of other SL-capable UEs, increasing value for end users and services providers of OTT services that can utilize SL communications improved in this manner.

In an example scenario, factory status information may be collected and analyzed by the host 2202. As another example, the host 2202 may process audio and video data which may have been retrieved from a UE for use in creating maps. As another example, the host 2202 may collect and analyze real-time data to assist in controlling vehicle congestion (e.g., controlling traffic lights). As another example, the host 2202 may store surveillance video uploaded by a UE. As another example, the host 2202 may store or control access to media content such as video, audio, VR or AR which it can broadcast, multicast or unicast to UEs. As other examples, the host 2202 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 2250 between the host 2202 and UE 2206, in response to variations in the measurement results. The measurement procedure and/or the network functionality for reconfiguring the OTT connection may be implemented in software and hardware of the host 2202 and/or UE 2206. In some embodiments, sensors (not shown) may be deployed in or in association with other devices through which the OTT connection 2250 passes; the sensors may participate in the measurement procedure by supplying values of the monitored quantities exemplified above, or supplying values of other physical quantities from which software may compute or estimate the monitored quantities. The reconfiguring of the OTT connection 2250 may include message format, retransmission settings, preferred routing etc.; the reconfiguring need not directly alter the operation of the network node 2204. Such procedures and functionalities may be known and practiced in the art. In certain embodiments, measurements may involve proprietary UE signaling that facilitates measurements of throughput, propagation times, latency and the like, by the host 2202. The measurements may be implemented in that software causes messages to be transmitted, in particular empty or 'dummy' messages, using the OTT connection 2250 while monitoring propagation times, errors, etc.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously.

Embodiments of the techniques and apparatus described herein also include, but are not limited to, the following enumerated examples:

A1. A method for a first user equipment (UE) configured for sidelink (SL) communication with one or more other UEs in a cell of a radio access network (RAN), the method comprising:
- receiving, from a RAN node, one or more messages indicating the RAN node's support for SL functionality in the cell; and
- based on the received one or more messages, selectively initiating a SL discovery procedure to discover at least a second UE that supports SL communications.

A2. The method of embodiment A1, wherein the one or more messages include one or more of the following:
- a first indication of whether the RAN node supports SL relay functionality; and
- a second indication of whether the RAN node supports SL discovery functionality.

A3. The method of embodiment A2, wherein:
- absence of the first indication indicates that the RAN node does not support SL relay functionality; and
- presence of the first indication indicates that the RAN node supports SL relay functionality.

A3a. The method of embodiment A3, wherein when present, the first indication can have any one of the following values:
- a first value indicating that the RAN node supports layer-2 (L2) SL relay,
- a second value indicating that the RAN node supports layer-3 (L3) SL relay, and
- a third value indicating that the RAN node supports both L2 and L3 SL relay.

A4. The method of any of embodiments A2-A3a, wherein:
- absence of the second indication indicates that the RAN node does not support SL discovery functionality; and
- when present, the second indication can have one of the following values:
  - a first value indicating that the RAN node supports relay discovery,
  - a second value indicating that the RAN node supports non-relay discovery, and
  - a third value indicating that the RAN node supports both relay and non-relay discovery.

A5. The method of embodiment A4, wherein the following conditions indicate that the RAN node supports non-relay discovery but does provide SL discovery configurations to UEs: the second indication being present and having the second value; and absence of SL discovery configurations from the one or more messages.

A6. The method of any of embodiments A2-A3a, wherein:
- the second indication includes one or more SL discovery configurations; and
- the one or more SL discovery configurations being present and non-empty indicates that the RAN node supports SL discovery functionality.

A7. The method of embodiment A6, wherein presence of the first indication and absence of the one or more SL discovery configurations indicates that the RAN node supports SL relay but does not provide SL discovery configurations to UEs.

A8. The method of any of embodiments A2-A3a, wherein the following conditions indicate that the RAN node does not support SL discovery: the first indication being absent from the one or more messages, the second indication being absent from the one or more messages; and absence of SL discovery configurations from the one or more messages.

A9. The method of any of embodiments A6-A8, wherein:
- when present in the one or more messages and non-empty, the one or more SL discovery configurations include a first discovery configuration for relay UEs and a second discovery configuration for non-relay UEs; and
- selectively initiating the discovery procedure comprises selecting one of the first and second discovery configurations for the discovery procedure based on whether the first UE is a relay UE or a non-relay UE.

A10. The method of any of embodiments A6-A9, wherein each of the one or more SL discovery configurations include one or more of the following:
- indication of one or more supported discovery models
- how often the UE can send a discovery message based on the supported discovery models
- one or more radio channel quality thresholds for triggering discovery procedures;
- one or more radio channel quality thresholds for discovering another UE during a discovery procedure;
- discovery resource pools; and
- frequency bands or carriers on which discovery is supported.

A11. The method of any of embodiments A1-A10, wherein the one or more messages are received as one of the following: one or more broadcast system information blocks (SIBs), or a single unicast radio resource control (RRC) message.

B1. A method for a radio access network (RAN) node to indicate support for sidelink (SL) discovery functionality in a cell of the RAN, the method comprising:

sending, to one or more user equipment (UEs), one or more messages indicating the RAN node's support for SL functionality in the cell, the one or more messages including at least one of the following:

a first indication of whether the RAN node supports SL relay functionality, a second indication of whether the RAN node supports SL discovery functionality, and one or more SL discovery configurations for UEs.

B2. The method of embodiment B1, wherein:

absence of the first indication indicates that the RAN node does not support SL relay functionality; and presence of the first indication indicates that the RAN node supports SL relay functionality.

B3. The method of embodiment B2, wherein when present, the first indication can have one of the following values:

a first value indicating that the RAN node supports layer-2 (L2) SL relay, a second value indicating that the RAN node supports layer-3 (L3) SL relay, and a third value indicating that the RAN node supports both L2 and L3 SL relay.

B4. The method of any of embodiments B2-B3, wherein:

absence of the second indication indicates that the RAN node does not support SL discovery functionality; and when present, the second indication can have one of the following values:

a first value indicating that the RAN node supports relay discovery, a second value indicating that the RAN node supports non-relay discovery, and a third value indicating that the RAN node supports both relay and non-relay discovery.

B5. The method of embodiment B4, wherein the following conditions indicate that the RAN node supports non-relay discovery but does provide SL discovery configurations to UEs: the second indication being present and having the second value; and absence of SL discovery configurations from the one or more messages.

B6. The method of any of embodiments B2-B3, wherein:

the second indication includes one or more SL discovery configurations; and the one or more SL discovery configurations being present and non-empty indicates that the RAN node supports SL discovery functionality.

B7. The method of embodiment B6, wherein presence of the first indication and absence of the one or more SL discovery configurations indicates that the RAN node supports SL relay but does not provide SL discovery configurations to UEs.

B8. The method of any of embodiments B2-B3, wherein the following conditions indicate that the RAN node does not support SL discovery: the first indication being absent from the one or more messages, the second indication being absent from the one or more messages; and absence of SL discovery configurations from the one or more messages.

B9. The method of any of embodiments B6-B8, wherein when present in the one or more messages and non-empty, the one or more SL discovery configurations include a first discovery configuration for relay UEs and a second discovery configuration for non-relay UEs.

B10. The method of any of embodiments B6-B9, wherein each of the one or more SL discovery configurations include one or more of the following indication of one or more supported discovery models how often the UE can send a discovery message based on the supported discovery models one or more radio channel quality thresholds for triggering discovery procedures;

one or more radio channel quality thresholds for discovering another UE during a discovery procedure;

discovery resource pools; and frequency bands or carriers on which discovery is supported.

B11. The method of any of embodiments B1-B10, wherein the one or more messages are sent as one of the following: one or more system information blocks (SIBs) broadcast to all UEs in the cell, or one or more unicast radio resource control (RRC) messages sent to the respective one or more UEs.

C1. A first user equipment (UE) configured for sidelink (SL) communication with one or more other UEs in a cell of a radio access network (RAN), the first UE comprising:

communication interface circuitry configured to communicate with a RAN node serving the cell and with the other UEs; and processing circuitry operatively coupled to the communication interface circuitry, whereby the processing circuitry and the communication interface circuitry are configured to perform operations corresponding to any of the methods of embodiments A1-A11.

C2. A first user equipment (UE) configured for sidelink (SL) communication with one or more other UEs in a cell of a radio access network (RAN), the first UE being further configured to perform operations corresponding to any of the methods of embodiments A1-A11.

C3. A non-transitory, computer-readable medium storing computer-executable instructions that, when executed by processing circuitry of a first user equipment (UE) configured for sidelink (SL) communication with one or more other UEs in a cell of a radio access network (RAN), configure the first UE to perform operations corresponding to any of the methods of embodiments A1-A11.

C4. A computer program product comprising computer-executable instructions that, when executed by processing circuitry of a first user equipment (UE) configured for sidelink (SL) communication with one or more other UEs in a cell of a radio access network (RAN), configure the first UE to perform operations corresponding to any of the methods of embodiments A1-A11.

D1. A radio access network (RAN) node to indicate support for sidelink (SL) discovery functionality in a cell of the RAN, the RAN node comprising:

communication interface circuitry configured to communicate with UEs in the cell; and processing circuitry operatively coupled to the communication interface circuitry, whereby the processing circuitry and the communication interface circuitry are configured to perform operations corresponding to any of the methods of embodiments B1-B11.

D2. A radio access network (RAN) node to indicate support for sidelink (SL) discovery functionality in a cell of the RAN, the RAN node being further configured to perform operations corresponding to any of the methods of embodiments B1-B11.

D3. A non-transitory, computer-readable medium storing computer-executable instructions that, when executed by processing circuitry of a radio access network (RAN) node to indicate support for sidelink (SL) discovery functionality in a cell of the RAN, configure the positioning node to perform operations corresponding to any of the methods of embodiments B1-B11.

D4. A computer program product comprising computer-executable instructions that, when executed by processing circuitry of a radio access network (RAN) node to indicate support for sidelink (SL) discovery functionality in a cell of the RAN, configure the positioning node to perform operations corresponding to any of the methods of embodiments B1-B11.

The invention claimed is:

1. A method for a first user equipment (UE) configured for sidelink (SL) operation in a cell of a radio access network (RAN), the method comprising:

receiving, from a RAN node via the cell, one or more messages including a configuration for SL discovery and/or communications, wherein the configuration includes:

a first indication of whether the RAN node supports SL relay functionality, and a second indication of whether the RAN node supports SL discovery functionality, wherein:

presence of a first field in the second indication indicates that that the RAN node supports SL discovery functionality for SL relay purposes;

presence of a second field in the second indication indicates that the RAN node supports SL discovery functionality for SL purposes other than SL relay; and when both are present, the second field is separate from the first field; and based on the configuration, selectively initiating a SL discovery procedure to discover at least a second UE that supports SL communications.

2. The method of claim 1, wherein absence of the first indication indicates that the RAN node does not support SL relay functionality.

3. The method of claim 2, wherein when present, the first indication can have a first value indicating that the RAN node supports layer-2 SL relay.

4. The method of claim 3, wherein when present, the first indication can also have any of the following values:

a second value indicating that the RAN node supports layer-3 SL relay, and a third value indicating that the RAN node supports layer-2 SL relay and layer-3 SL relay.

5. The method of claim 1, wherein the following indicates that the RAN node supports non-relay discovery but does provide SL discovery configurations to UEs:

presence of the second field in the second indication; and absence of SL discovery configurations from the one or more messages.

6. The method of claim 1, wherein:

the one or more messages also include a first discovery configuration for relay UEs; and selectively initiating the SL discovery procedure comprises selecting the first discovery configuration for the SL discovery procedure when the first UE is a relay UE.

7. The method of claim 6, wherein the first discovery configuration includes one or more of the following:

indication of one or more supported discovery models;

how often the UE can send a discovery message based on the supported discovery models;

one or more radio channel quality thresholds for triggering discovery procedures;

one or more radio channel quality thresholds for discovering another UE during a discovery procedure;

discovery resource pools; and frequency bands or carriers on which discovery is supported.

8. The method of claim 1, wherein:

the one or more messages also include a second discovery configuration for non-relay UEs; and selectively initiating the SL discovery procedure comprises selecting the second discovery configuration for the SL discovery procedure when the first UE is a non-relay UE.

9. The method of claim 8, wherein the second SL discovery configuration includes one or more of the following:

indication of one or more supported discovery models;

how often the UE can send a discovery message based on the supported discovery models;

one or more radio channel quality thresholds for triggering discovery procedures;

one or more radio channel quality thresholds for discovering another UE during a discovery procedure;

discovery resource pools; and frequency bands or carriers on which discovery is supported.

10. The method of claim 1, wherein the one or more messages are received as one of the following: one or more system information blocks (SIBs) broadcast in the cell, or a single unicast radio resource control (RRC) message.

11. The method of claim 10, wherein the following indicates that the RAN node supports non-relay discovery but does provide SL discovery configurations to UEs:

presence of the second field in the second indication; and absence of SL discovery configurations from the one or more messages.

12. The method of claim 10, wherein the one or more messages also include a first discovery configuration for relay UEs and a second discovery configuration for non-relay UEs.

13. The method of claim 12, wherein each of the first and second SL discovery configurations include one or more of the following indication of one or more supported discovery models;

how often the UE can send a discovery message based on the supported discovery models;

one or more radio channel quality thresholds for triggering discovery procedures;

one or more radio channel quality thresholds for discovering another UE during a discovery procedure;

discovery resource pools; and frequency bands or carriers on which discovery is supported.

14. The method of claim 10, wherein the one or more messages are sent as one of the following: one or more system information blocks (SIBs) broadcast in the cell, or one or more unicast radio resource control (RRC) messages to the respective one or more UEs.

15. A method for a radio access network (RAN) node to configure user equipment (UEs) for sidelink (SL) operation, the method comprising:

sending, to one or more UEs via a cell, one or more messages including a configuration for SL discovery and/or communications, wherein the configuration includes:

a first indication of whether the RAN node supports SL relay functionality, and a second indication of whether the RAN node supports SL discovery functionality, wherein:

presence of a first field in the second indication indicates that that the RAN node supports SL discovery functionality for SL relay purposes;

presence of a second field in the second indication indicates that the RAN node supports SL discovery functionality for SL purposes other than SL relay; and when both are present, the second field is separate from the first field.

16. The method of claim 15, wherein absence of the first indication indicates that the RAN node does not support SL relay functionality.

17. The method of claim 16, wherein when present, the first indication can have a first value indicating that the RAN node supports layer-2 SL relay.

18. The method of claim 17, wherein when present, the first indication can also have any of the following values:

a second value indicating that the RAN node supports layer-3 SL relay, and a third value indicating that the RAN node supports layer-2 SL relay and layer-3 SL relay.

19. A first user equipment (UE) configured for sidelink (SL) operation in a cell of a radio access network (RAN), the first UE comprising:

communication interface circuitry configured to communicate with a RAN node via the cell and with other UEs via SL; and processing circuitry operatively coupled to the communication interface circuitry, whereby the processing circuitry and the communication interface circuitry are configured to:

receive, from the RAN node via the cell, one or more messages including a configuration for SL discovery and/or communications, wherein the configuration includes:

a first indication of whether the RAN node supports SL relay functionality, and a second indication of whether the RAN node supports SL discovery functionality, wherein:

presence of a first field in the second indication indicates that that the RAN node supports SL discovery functionality for SL relay purposes;

presence of a second field in the second indication indicates that the RAN node supports SL discovery functionality for SL purposes other than SL relay; and when both are present, the second field is separate from the first field; and based on the configuration, selectively initiate a SL discovery procedure to discover at least a second UE that supports SL communications.

20. The first UE of claim 19, wherein the one or more messages also include a first discovery configuration for relay UEs, and the first discovery configuration includes one or more of the following:

indication of one or more supported discovery models;

how often the UE can send a discovery message based on the supported discovery models;

one or more radio channel quality thresholds for triggering discovery procedures;

one or more radio channel quality thresholds for discovering another UE during a discovery procedure;

discovery resource pools; and frequency bands or carriers on which discovery is supported.

21. A non-transitory, computer-readable medium storing computer-executable instructions that, when executed by processing circuitry of a first user equipment (UE) configured for sidelink (SL) operation in a cell of a radio access network (RAN), configure the first UE to:

receive, from a RAN node via the cell, one or more messages including a configuration for SL discovery and/or communications, wherein the configuration includes:

a first indication of whether the RAN node supports SL relay functionality, and a second indication of whether the RAN node supports SL discovery functionality, wherein:

presence of a first field in the second indication indicates that that the RAN node supports SL discovery functionality for SL relay purposes;

presence of a second field in the second indication indicates that the RAN node supports SL discovery functionality for SL purposes other than SL relay; and when both are present, the second field is separate from the first field; and based on the configuration, selectively initiate a SL discovery procedure to discover at least a second UE that supports SL communications.

22. A radio access network (RAN) node arranged to configure user equipment (UEs) for sidelink (SL) operation, the RAN node comprising:

communication interface circuitry configured to communicate with UEs via a cell; and processing circuitry operatively coupled to the communication interface circuitry, whereby the processing circuitry and the communication interface circuitry are configured to:

send, to one or more UEs via the cell, one or more messages including a configuration for SL discovery and/or communications, wherein the configuration includes:

a first indication of whether the RAN node supports SL relay functionality, and a second indication of whether the RAN node supports SL discovery functionality, wherein:

presence of a first field in the second indication indicates that that the RAN node supports SL discovery functionality for SL relay purposes;

presence of a second field in the second indication indicates that the RAN node supports SL discovery functionality for SL purposes other than SL relay; and when both are present, the second field is separate from the first field.

23. The RAN node of claim 22, wherein the one or more messages also include a first discovery configuration for relay UEs, and the first discovery configuration includes one or more of the following:

indication of one or more supported discovery models;

how often the UE can send a discovery message based on the supported discovery models;

one or more radio channel quality thresholds for triggering discovery procedures;

one or more radio channel quality thresholds for discovering another UE during a discovery procedure;

discovery resource pools; and frequency bands or carriers on which discovery is supported.

24. A non-transitory, computer-readable medium storing computer-executable instructions that, when executed by processing circuitry of radio access network (RAN) node arranged to configure user equipment (UEs) for sidelink (SL) operation, configure the RAN node to:

send, to one or more UEs via the cell, one or more messages including a configuration for SL discovery and/or communications, wherein the configuration includes:

a first indication of whether the RAN node supports SL relay functionality, and a second indication of whether the RAN node supports SL discovery functionality, wherein:

presence of a first field in the second indication indicates that that the RAN node supports SL discovery functionality for SL relay purposes;

presence of a second field in the second indication indicates that the RAN node supports SL discovery functionality for SL purposes other than SL relay; and when both are present, the second field is separate from the first field.

* * * * *